United States Patent
Cochran et al.

(10) Patent No.: US 11,813,892 B2
(45) Date of Patent: Nov. 14, 2023

(54) ACRYLATED AND ACYLATED OR ACETALIZED POLYOL AS A BIOBASED SUBSTITUTE FOR HARD, RIGID THERMOPLASTIC AND THERMOSET MATERIALS

(71) Applicant: IOWA STATE UNIVERSITY RESEARCH FOUNDATION, INC., Ames, IA (US)

(72) Inventors: Eric W. Cochran, Ames, IA (US); Nacu Hernandez, Ames, IA (US); Michael Forrester, Ames, IA (US); Shailja Goyal, Ames, IA (US); Austin Hohmann, Dubuque, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 5 days.

(21) Appl. No.: 17/554,544

(22) Filed: Dec. 17, 2021

(65) Prior Publication Data
US 2022/0105753 A1    Apr. 7, 2022

Related U.S. Application Data

(63) Continuation of application No. 16/272,261, filed on Feb. 11, 2019, now Pat. No. 11,248,076, which is a
(Continued)

(51) Int. Cl.
*C08F 293/00* (2006.01)
*C08F 22/10* (2006.01)
(Continued)

(52) U.S. Cl.
CPC .............. *B60C 1/00* (2013.01); *C04B 26/26* (2013.01); *C08F 20/28* (2013.01); *C08F 220/28* (2013.01);
(Continued)

(58) Field of Classification Search
None
See application file for complete search history.

(56) References Cited

U.S. PATENT DOCUMENTS 3,285,871 A    11/1966  Carlson
3,657,117 A     4/1972  Pfitzner et al.
(Continued)

FOREIGN PATENT DOCUMENTS

CN        103044651 A    4/2013
WO    2007046741 A1    4/2007
(Continued)

OTHER PUBLICATIONS

Louage et al., Biomacromolecules 2015, 16, 336-350.*
(Continued)

*Primary Examiner* — Vu A Nguyen
(74) *Attorney, Agent, or Firm* — Troutman Pepper Hamilton Sanders LLP (Rochester)

(57) ABSTRACT

The present invention relates to a homopolymer, copolymer, block copolymer, and statistical copolymer comprising plural polyol monomeric units. The polyol monomeric units being acrylated and acylated or acetalized. The acrylated and acylated or acetalized polyol monomeric units have an average degree of acrylation which is 1 or more, but less than the number of the hydroxyl groups of the polyol and have an average degree of acylation or acetalization which is 1 or more, but less than the number of the hydroxyl groups of the polyol. The present invention also relates to a method of making the homopolymers, copolymers, block copolymers, and statistical copolymers, and using them in various applications, such as asphalt rubber modifiers, adhesives, or an additive in a fracking fluid for oil fracking.

15 Claims, 14 Drawing Sheets

Related U.S. Application Data continuation-in-part of application No. PCT/US2017/045340, filed on Aug. 3, 2017.

(60) Provisional application No. 62/374,414, filed on Aug. 12, 2016.

(51) Int. Cl.
*C08F 222/10* (2006.01)
*B60C 1/00* (2006.01)
*C04B 26/26* (2006.01)
*C09J 133/06* (2006.01)
*C08F 20/28* (2006.01)
*C08F 220/28* (2006.01)
*C04B 111/00* (2006.01)
*C04B 24/02* (2006.01)
*C04B 24/26* (2006.01)

(52) U.S. Cl.
CPC ......... *C08F 293/005* (2013.01); *C09J 133/06* (2013.01); *C04B 24/02* (2013.01); *C04B 24/2641* (2013.01); *C04B 2111/0075* (2013.01); *C08F 220/282* (2020.02); *C08F 220/283* (2020.02); *C08F 2438/03* (2013.01); *C08F 2500/01* (2013.01)

(56) References Cited

U.S. PATENT DOCUMENTS

| | | | |
|---|---|---|---|
| 3,993,663 | A | 11/1976 | Takiyama et al. |
| 5,936,015 | A | 8/1999 | Burns |
| 8,628,911 | B2* | 1/2014 | Bae .................... C08F 220/283 430/326 |
| 10,066,051 | B2 | 9/2018 | Cochran et al. |
| 10,633,485 | B2 | 4/2020 | Cochran et al. |
| 10,844,166 | B2 | 11/2020 | Cochran et al. |
| 10,947,340 | B2 | 3/2021 | Cochran et al. |
| 10,947,341 | B2 | 3/2021 | Cochran et al. |
| 11,248,076 | B2* | 2/2022 | Cochran .................. B60C 1/00 |
| 2002/0164547 | A1 | 11/2002 | Ferm et al. |
| 2005/0065310 | A1 | 3/2005 | Wang et al. |
| 2013/0095330 | A1 | 4/2013 | Sommer et al. |
| 2013/0184383 | A1 | 7/2013 | Cochran et al. |
| 2014/0114034 | A1 | 4/2014 | Oshikiri et al. |
| 2014/0343192 | A1 | 11/2014 | Cochran et al. |
| 2015/0337078 | A1 | 11/2015 | Cochran et al. |
| 2016/0120984 | A1* | 5/2016 | Navale .................. A61K 47/32 514/772.5 |
| 2016/0229863 | A1* | 8/2016 | Hillmyer ............... C08F 293/00 |
| 2019/0040190 | A1 | 2/2019 | Cochran et al. |
| 2019/0135971 | A1 | 5/2019 | Cocrhan et al. |
| 2019/0135972 | A1 | 5/2019 | Cochran et al. |
| 2019/0135973 | A1 | 5/2019 | Cochran et al. |

FOREIGN PATENT DOCUMENTS

| | | |
|---|---|---|
| WO | 2009134388 A1 | 11/2009 |
| WO | 2012/057748 A1 | 5/2012 |
| WO | 2012057748 A1 | 5/2012 |
| WO | 20130144028 A1 | 10/2013 |
| WO | 2015/179553 A2 | 11/2015 |
| WO | 2015179553 A2 | 11/2015 |

OTHER PUBLICATIONS

International Search Report and Written Opinion for corresponding Application No. PCT/US2017/045340 (dated Oct. 5, 2017).
International Preliminary Report on Patentability for Application No. PCT/US2017/045340 (dated Feb. 12, 2019).
Office Action in U.S. Appl. No. 16/212,989, dated Apr. 10, 2020.
Office Action in U.S. Appl. No. 16/213,018, dated Jul. 22, 2020.
Office Action for Singapore National Application No. 11201609358Q, based on PCT/US2015/031824, dated Mar. 23, 2018.
Office Action for Singapore National Application No. 11201609358Q, based on PCT/US2015/031824, dated Sep. 7, 2018.
Office Action for Chinese National Application No. 201580026275.5, dated May 9, 2018.
Office Action and translation for Eurasia National Application No. 201692352, based on PCT/US2015/031824, dated Dec. 26, 2017.
International Preliminary Report on Patentability for PCT/US2015/031824, dated Nov. 22, 2016.
International Search Report and Written Opinion of the International Search Authority for PCT/US2015/031824, dated Nov. 18, 2015.
Pham, et al., "Various Radical Polymerizations of Glycerol-Based Monomers," Eur. J. Lipid Sci. Technol., 115:28-40 (2013).
Preliminary Office Action in Brazil Application No. BR112016026839-3, based on PCT/US2015/031824, dated Mar. 13, 2020.
Election of Species Requirement in U.S. Appl. No. 16/213,018, dated Apr. 9, 2020.
Gilanizadeh et al., "Direct Transformation of Epoxides to 1,2-Diacetates with Ac2O/B(OH)3 System," J. Chem. Soc. Pak. 37(6):1234-1238 (2015).
Office Action in U.S. Appl. No. 16/213,054, dated Jul. 23, 2020.
Office Action in U.S. Appl. No. 14/717,777, dated Nov. 16, 2017.
Office Action in U.S. Appl. No. 14/717,777, dated May 31, 2017.
Election of Species Requirement in U.S. Appl. No. 16/213,054, dated Apr. 8, 2020.
Kim et al., "Chemically Amplified Resists Based on Acrylate Polymers Containing Ketal Groups in the Side Chains," Proc. SPIE 3678, Advances in Resist Technology and Processing XVI 625-632 (1999).
Computer-Generated English-Language Translation of JPH06027747A to Kato (Year: 1994).
Partial SciFinder Search Mar. 24, 2021.

* cited by examiner

ACRYLATED AND ACYLATED OR ACETALIZED POLYOL AS A BIOBASED SUBSTITUTE FOR HARD, RIGID THERMOPLASTIC AND THERMOSET MATERIALS

This application is a continuation of U.S. patent application Ser. No. 16/272,261 filed Feb. 11, 2019, which is a continuation-in-part under 35 U.S.C. § 111(a) of International Application No. PCT/US2017/045340, filed Aug. 3, 2017, which claims the benefit of U.S. Provisional Patent Application Ser. No. 62/374,414, filed Aug. 12, 2016, which are hereby incorporated by reference in their entirety.

FIELD OF THE INVENTION

The present invention relates to an acrylated and acylated or acetalized polyol as a biobased substitute for hard, rigid thermoplastic and thermoset materials.

BACKGROUND OF THE INVENTION

Glycerol (1,2,3-propanetriol) is a monomer derived from both natural and petrochemical feedstocks and is considered one of the most versatile chemicals for it wide range of applications. It is the backbone of all animal and vegetable triglycerides and constitutes an average 10% by weight of the fatty matter. With the recent explosion in production of biofuels glycerol has rapidly become a surplus in the market, as it is created as a byproduct in the manufacturing of biodiesel by transesterification of vegetable oils with methanol using NaOH as a catalyst (Pagliaro et al., "The Future of Glycerol," 2nd Edition, RSC Green Chemistry. The Royal Society of Chemistry, second edition (2010)). The glycerol molecule was successfully modified such that when it was polymerized soft thermoplastic elastomers were created. These soft thermoplastic elastomers can be used in a wide range of applications, i.e. pressure sensitive adhesives, viscosity modifiers, etc.

Polyols contain more than one alcohol group on their chemical backbone, which give them the possibility of being modified to adjust the final properties of the polymers, thus, making the materials suitable for a wider range of applications. Most polymers derived from polyols are soft materials.

The present invention is directed to overcoming these and other deficiencies in the art.

SUMMARY OF THE INVENTION

One aspect of the present invention relates to a homopolymer comprising plural polyol monomeric units. The polyol monomeric units being acrylated and acylated or acetalized. The acrylated and acylated or acetalized polyol monomeric units have an average degree of acrylation which is 1 or more, but less than the number of the hydroxyl groups of the polyol and have an average degree of acylation or acetalization which is 1 or more, but less than the number of the hydroxyl groups of the polyol.

Another aspect of the present invention relates to a copolymer comprising plural polyol monomeric units. The polyol monomeric units being acrylated and acylated or acetalized. The acrylated and acylated or acetalized polyol monomeric units have an average degree of acrylation which is 1 or more, but less than the number of the hydroxyl groups of the polyol and have an average degree of acylation or acetalization which is 1 or more, but less than the number of the hydroxyl groups of the polyol.

Another aspect of the present invention relates to a block copolymer comprising at least one PA block and at least one PB block. PA represents a polymer block comprising one or more units of monomer A and PB represents a polymer block comprising one or more units of monomer B. Monomer A is an acrylated and acylated or acetalized polyol monomeric unit. The acrylated and acylated or acetalized polyol monomeric unit has an average degree of acrylation which is 1 or more, but less than the number of the hydroxyl groups of the polyol and have an average degree of acylation or acetalization which is 1 or more, but less than the number of the hydroxyl groups of the polyol. Monomer B is a radically polymerizable monomer.

Another aspect of the present invention relates to a statistical copolymer having a general formula of:

$[A_i\text{-}B_j\text{-}C_k]_q$, wherein:

A represents monomer A, which is an acrylated and acylated or acetalized polyol monomeric unit, wherein the acrylated and acylated or acetalized polyol monomeric unit has an average degree of acrylation which is 1 or more, but less than the number of the hydroxyl groups of the polyol and have an average degree of acylation or acetalization which is 1 or more, but less than the number of the hydroxyl groups of the polyol;

B represents monomer B, which is a radically polymerizable monomer; and

C represents monomer C, which is a radically polymerizable monomer, provided that the monomer B is different than the monomer A, and the monomer C is different than the monomer A or monomer B;

i, j, and k are average number of repeating units of monomer A, monomer B, and monomer C, respectively, such that i and j are each greater than 0 and less than 1, k is 0 to less than 1, provided that i+j+k=1; and q represents the number average degree of polymerization and ranges from 10 to 100,000.

Another aspect of the present invention relates to a method of making a homopolymer or copolymer. The method comprises providing an acrylated and acylated or acetalized polyol composition comprising plural polyol monomeric units. The polyol monomeric units being acrylated and acylated or acetalized. The acrylated and acylated or acetalized polyol composition has an average degree of acrylation which is 1 or more, but less than the number of the hydroxyl groups of the polyol and have an average degree of acylation or acetalization which is 1 or more, but less than the number of the hydroxyl groups of the polyol. The method also comprises polymerizing the acrylated and acylated or acetalized polyol composition, through controlled radical polymerization, to form the homopolymer or copolymer.

Another aspect of the present invention relates to a method of preparing a statistical copolymer. The method comprises providing monomer A, which is an acrylated and acylated or acetalized polyol monomeric unit. The acrylated and acylated or acetalized polyol monomeric unit has an average degree of acrylation which is 1 or more, but less than the number of the hydroxyl groups of the polyol and have an average degree of acylation or acetalization which is 1 or more, but less than the number of the hydroxyl groups of the polyol. The method also comprises providing a radically polymerizable monomer, represented by monomer B. The method further comprises polymerizing monomer A and monomer B simultaneously, via reversible addition-fragmentation chain-transfer polymerization (RAFT), in the presence of a free radical initiator and a chain transfer agent to form the statistical copolymer.

Another aspect of the present invention relates to an asphalt binder composition. The asphalt binder composition comprises: the thermoplastic homopolymer, the thermoplastic copolymer, the thermoplastic block copolymer, or the thermoplastic statistical copolymer, of the present invention; and a crumb rubber.

Another aspect of the present invention relates to an adhesive or sealant composition. The adhesive or sealant composition comprises: the thermoplastic homopolymer, the thermoplastic copolymer, the thermoplastic block copolymer, or the thermoplastic statistical copolymer, of the present invention; and a tackifier, and/or a plasticizer, and/or a solvent.

Another aspect of the present invention relates to a tire composition. The tire composition comprises the thermoplastic homopolymer, the thermoplastic copolymer, the thermoplastic block copolymer, or the thermoplastic statistical copolymer, of the present invention; and a rubber compound.

Another aspect of the present invention relates to a fracking fluid composition. The fracking fluid composition comprises: water; sand; the thermoplastic homopolymer, the thermoplastic copolymer, the thermoplastic block copolymer, or the thermoplastic statistical copolymer, of the present invention, as a chemical additive; and optionally a thermoplastic polymer block added to confer a desired fluid property to the thermoplastic homopolymer, thermoplastic copolymer, thermoplastic statistical copolymer, or thermoplastic block copolymer.

Another aspect of the present invention relates to an asphalt composition. The asphalt composition comprises: i) an asphalt component; ii) a crumb rubber having a weight percentage in the range of 1% to 15%; and iii) the thermoplastic homopolymer, the thermoplastic copolymer, the thermoplastic block copolymer, or the thermoplastic statistical copolymer, of the present invention, as an asphalt additive, modifier, and/or filler having a weight percentage in the range of 0.01% to 1.05%.

Another aspect of the present invention relates to a method for preparing a homogeneous asphalt composition. The method comprises mixing the thermoplastic homopolymer, the thermoplastic copolymer, the thermoplastic block copolymer, or the thermoplastic statistical copolymer, of the present invention, as an asphalt additive, modifier, and/or filler, with a weight percentage in the range of 0.01% to 1.05%, into an asphalt composition to form a homogeneous asphalt composition. The asphalt composition comprises i) an asphalt component, and ii) a crumb rubber having a weight percentage in the range of 1% to 15%.

Another aspect of the present invention relates to a method for preparing a fracking liquid. The method comprises mixing the thermoplastic homopolymer, the thermoplastic copolymer, the thermoplastic block copolymer, or the thermoplastic statistical copolymer, of the present invention, as a chemical additive, with water, and sand.

Another aspect of the present invention relates to a method for preparing an adhesive or sealant composition. The method comprises mixing the thermoplastic homopolymer, the thermoplastic copolymer, the thermoplastic block copolymer, or the thermoplastic statistical copolymer, of the present invention, with a tackifier, and/or a plasticizer, and/or a solvent.

Another aspect of the present invention relates to a packaging composition. The packaging composition comprises the thermosetting homopolymer, the thermosetting copolymer, the thermosetting block copolymer, or the thermosetting statistical copolymer, of the present invention.

The present application relates to the synthesis of hard materials from polyols. These materials that can be used in applications such as: packaging, consumer goods, toys, electronics, etc.

Polyols contain more than one alcohol group on their chemical backbone, which give them the possibility of being modified to adjust the final properties of the polymers. This makes the materials suitable for a wider range of applications. Until recently, most polymers derived from polyols were soft materials. By modifying the polyols with acids like: methacrylic acid, acetic acid, or itaconic acid, new types of monomers were created. When polymerized, these monomers result in materials that exhibit properties similar to those of hard materials, e.g. glass transition temperatures above 100° C.

The present application describes the successful polymerization of acetylated methacrylated glycerol (AMG) (FIGS. 1A-B) into a hard thermosetting block using free radical polymerization and gives the possibility of polymerizing it using controlled free radical polymerization techniques, such as Reversible Addition Fragmentation Chain Transfer (RAFT) or Atom Transfer Radical Polymerization (ATRP) to produce thermoplastic and thermoset hard blocks. AMG can be used to replace the hard thermoplastic block in a wide variety of thermoplastic/thermoset polymers, such as: SBS type polymers, ABS type polymers, etc. This application will help fine tune the material's properties so that it may meet the quality, durability and safety needs.

The properties of the Poly(AMG) can be enhanced by the modifying the remaining alcohols in the glycerol backbone, by having different functional groups will allow adjustment of the mechanical/chemical/physical properties of the polymers, making the materials suitable for a wider range of applications.

DETAILED DESCRIPTION OF THE INVENTION

Figure 1A:
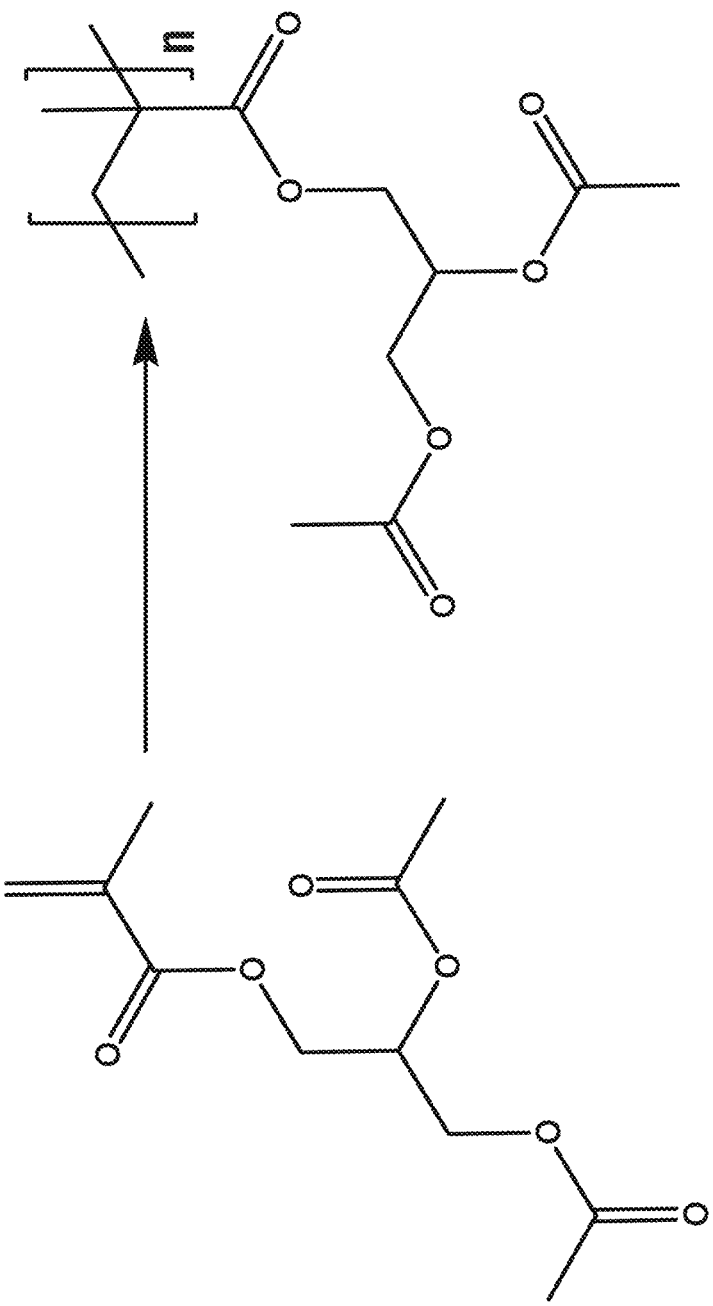
FIGS. 1A-B show a diagram of proposed biobased material, poly(acetylated methacrylated glycerol) (FIG. 1A) and an image of cylinder made of poly(acetylated methacrylated glycerol) (FIG. 1B).
Figure 1B:
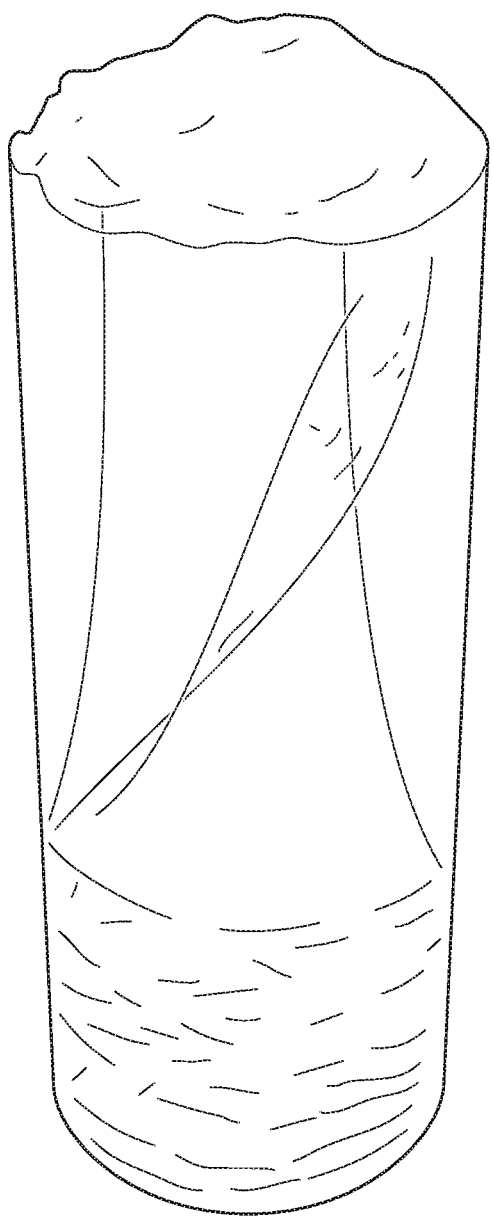

One aspect of the present invention relates to a homopolymer comprising plural polyol monomeric units. The polyol monomeric units being acrylated and acylated or acetalized. The acrylated and acylated or acetalized polyol monomeric units have an average degree of acrylation which is 1 or more, but less than the number of the hydroxyl groups of the polyol and have an average degree of acylation or acetalization which is 1 or more, but less than the number of the hydroxyl groups of the polyol.

In one embodiment, the homopolymer is a thermosetting homopolymer.

In another embodiment, the homopolymer is a thermoplastic homopolymer.

The homopolymer has a molecular weight of at least 1 KDa, for instance, a molecular weight of 1 KDa to 10 MDa, 10 KDa to 10 MDa, 50 KDa to 10 MDa, or 50 KDa to 200 KDa.

In one embodiment, the homopolymer comprises plural polyol monomeric units and polyol monomeric units are acrylated and acylated. The acrylated and acylated polyol monomeric units have an average degree of acrylation which is 1 or more, but less than the number of the hydroxyl groups of the polyol and have an average degree of acylation which is 1 or more, but less than the number of the hydroxyl groups of the polyol.

In another embodiment, the homopolymer comprises plural polyol monomeric units and polyol monomeric units are acrylated and acetalized. The acrylated and acetalized polyol monomeric units have an average degree of acrylation which is 1 or more, but less than the number of the hydroxyl groups of the polyol and have an average degree of acetalization which is 1 or more, but less than the number of the hydroxyl groups of the polyol.

Another aspect of the present invention relates to a copolymer comprising plural polyol monomeric units. The polyol monomeric units being acrylated and acylated or acetalized. The acrylated and acylated or acetalized polyol monomeric units have an average degree of acrylation which is 1 or more, but less than the number of the hydroxyl groups of the polyol and have an average degree of acylation or acetalization which is 1 or more, but less than the number of the hydroxyl groups of the polyol.

In some embodiments, the acrylated and acylated or acetalized polyol monomeric units have the same degree of acrylation and acylation or acetalization of hydroxyl groups.

In some embodiments, the acrylated and acylated or acetalized polyol monomeric units have different degrees of acrylation and acylation or acetalization of hydroxyl groups.

In one embodiment, the copolymer is a thermosetting copolymer.

In another embodiment, the copolymer is a thermoplastic copolymer.

The copolymer has a linear or branched-chain structure. The copolymer has a molecular weight of at least 1 KDa, for instance, a molecular weight of 1 KDa to 10 MDa, 10 KDa to 10 MDa, 50 KDa to 10 MDa, or 50 KDa to 200 KDa.

In another embodiment, the copolymer further comprises one or more further monomeric units which are different than the acrylated and acylated or acetalized polyol monomeric units.

In one embodiment, the copolymer comprises plural polyol monomeric units. The polyol monomeric units are acrylated and acylated. The acrylated and acylated polyol monomeric units have an average degree of acrylation which is 1 or more, but less than the number of the hydroxyl groups of the polyol and have an average degree of acylation which is 1 or more, but less than the number of the hydroxyl groups of the polyol.

In another embodiment, the copolymer comprises plural polyol monomeric units. The polyol monomeric units are acrylated and acetalized. The acrylated and acetalized polyol monomeric units have an average degree of acrylation which is 1 or more, but less than the number of the hydroxyl groups of the polyol and have an average degree of acetalization which is 1 or more, but less than the number of the hydroxyl groups of the polyol.

Another aspect of the present invention relates to a block copolymer comprising at least one PA block and at least one PB block. PA represents a polymer block comprising one or more units of monomer A and PB represents a polymer block comprising one or more units of monomer B. Monomer A is an acrylated and acylated or acetalized polyol monomeric unit. The acrylated and acylated or acetalized polyol monomeric unit has an average degree of acrylation which is 1 or more, but less than the number of the hydroxyl groups of the polyol and have an average degree of acylation or acetalization which is 1 or more, but less than the number of the hydroxyl groups of the polyol. Monomer B is a radically polymerizable monomer.

In some embodiments, the acrylated and acylated or acetalized polyol monomeric units have the same degree of acrylation and acylation or acetalization of hydroxyl groups.

In some embodiments, the acrylated and acylated or acetalized polyol monomeric units have different degrees of acrylation and acylation or acetalization of hydroxyl groups.

In one embodiment, PA block and PB block each have a linear or branched-chain structure.

The block copolymer has a molecular weight ranging from 5 to 10 MDa, for instance, from 5 to 500 kDa, from about 15 to 300 kDa, from about 40 to about 100 kDa, or from about 80 to about 100 kDa.

In one embodiment, the block copolymer is a thermosetting block copolymer.

In another embodiment, the block copolymer is a thermoplastic block copolymer.

The block copolymer can further comprise at least one PC block. PC represents a polymer block comprising one or more units of monomer C, wherein monomer C is a radically polymerizable monomer.

In one embodiment, the block copolymer comprises at least one PA block and at least one PB block. PA represents a polymer block comprising one or more units of monomer A and PB represents a polymer block comprising one or more units of monomer B. Monomer A is an acrylated and acylated polyol monomeric unit. The acrylated and acylated polyol monomeric unit has an average degree of acrylation which is 1 or more, but less than the number of the hydroxyl groups of the polyol and have an average degree of acylation which is 1 or more, but less than the number of the hydroxyl groups of the polyol. Monomer B being a radically polymerizable monomer.

In another embodiment, the block copolymer comprises at least one PA block and at least one PB block. PA represents a polymer block comprising one or more units of monomer A and PB represents a polymer block comprising one or more units of monomer B. Monomer A is an acrylated and acetalized polyol monomeric unit. The acrylated and acetalized polyol monomeric unit has an average degree of acrylation which is 1 or more, but less than the number of the hydroxyl groups of the polyol and have an average degree of acetalization which is 1 or more, but less than the number of the hydroxyl groups of the polyol. Monomer B is a radically polymerizable monomer.

Another aspect of the present invention relates to a statistical copolymer having a general formula of:

$[A_i\text{-}B_j\text{-}C_k]_q$, wherein:

A represents monomer A, which is an acrylated and acylated or acetalized polyol monomeric unit, wherein the acrylated and acylated or acetalized polyol monomeric unit has an average degree of acrylation which is 1 or more, but less than the number of the hydroxyl groups of the polyol and have an average degree of acylation or acetalization which is 1 or more, but less than the number of the hydroxyl groups of the polyol;

B represents monomer B, which is a radically polymerizable monomer; and

C represents monomer C, which is a radically polymerizable monomer, provided that the monomer B is different than the monomer A, and the monomer C is different than the monomer A or monomer B;

i, j, and k are average number of repeating units of monomer A, monomer B, and monomer C, respectively, such that i and j are each greater than 0 and less than 1, k is 0 to less than 1, provided that i+j+k=1; and q represents the number average degree of polymerization and ranges from 10 to 100,000.

In some embodiments, the acrylated and acylated or acetalized polyol monomeric units have the same degree of acrylation and acylation or acetalization of hydroxyl groups.

In some embodiments, the acrylated and acylated or acetalized polyol monomeric units have different degrees of acrylation and acylation or acetalization of hydroxyl groups.

In one embodiment, the statistical copolymer is a thermosetting statistical copolymer.

In another embodiment, the statistical copolymer is a thermoplastic statistical copolymer.

In another embodiment, the acrylated and acylated or acetalized polyol monomeric unit contains one or more conjugated sites.

In one embodiment, the statistical copolymer has a general formula of:

$[A_i\text{-}B_j\text{-}C_k]_q$, wherein:

A represents monomer A, which is an acrylated and acylated polyol monomeric unit, wherein the acrylated and acylated polyol monomeric unit has an average degree of acrylation which is 1 or more, but less than the number of the hydroxyl groups of the polyol and have an average degree of acylation which is 1 or more, but less than the number of the hydroxyl groups of the polyol;

B represents monomer B, which is a radically polymerizable monomer; and

C represents monomer C, which is a radically polymerizable monomer, provided that the monomer B is different than the monomer A, and the monomer C is different than the monomer A or monomer B;

i, j, and k are average number of repeating units of monomer A, monomer B, and monomer C, respectively, such that i and j are each greater than 0 and less than 1, k is 0 to less than 1, provided that i+j+k=1; and q represents the number average degree of polymerization and ranges from 10 to 100,000.

In another embodiment, the statistical copolymer has a general formula of:

$[A_i\text{-}B_j\text{-}C_k]_q$, wherein:

A represents monomer A, which is an acrylated and acetalized polyol monomeric unit, wherein the acrylated and acetalized polyol monomeric unit has an average degree of acrylation which is 1 or more, but less than the number of the hydroxyl groups of the polyol and have an average degree of acetalization which is 1 or more, but less than the number of the hydroxyl groups of the polyol;

B represents monomer B, which is a radically polymerizable monomer; and

C represents monomer C, which is a radically polymerizable monomer, provided that the monomer B is different than the monomer A, and the monomer C is different than the monomer A or monomer B;

i, j, and k are average number of repeating units of monomer A, monomer B, and monomer C, respectively, such that i and j are each greater than 0 and less than 1, k is 0 to less than 1, provided that i+j+k=1; and q represents the number average degree of polymerization and ranges from 10 to 100,000.

The polyols that can be used in the homopolymer, copolymer, block copolymer, or statistical copolymer include any polyols that are readily derived from natural biofeedstock or petrochemical feedstock as well as saccharides that contain multiple hydroxyl functional groups. Suitable polyols include, but are not limited to, ethylene glycol, propylene glycol, dipropylene glycol, 1,2,4-butanetriol, 1,7-heptanediol, glycerol, panaxatriol, panaxytriol, talose, balsaminol B, momordol, erythritol, enterodiol, xylitol, miglitol, sorbitol, isosorbide, mannitol, galactitol, isomalt, maltitol, and mixtures thereof. Suitable polyols can also include saccharides such as aldohexose, aldopentose, aldotetrose, aldotriose, aldose, allose, altrose, arabinose, amylopectin, amylose, dextrose, erythrose, fructose, galactose, glucose, gulose, hexose, idose, ketohexose, ketose, lactose, lyxose, maltose, mannose, pentose, ribose, saccharose, sucrose, talose, tetrose, triose, xylose, as well as their respective stereoisomers. Exemplary polyols used are glycerol, sorbitol, isosorbide, and dextrose.

The acrylated and acylated polyol monomeric unit can be represented by $A_xB_yP$, in which x represents the average number of acrylic groups (A) per acrylated and acylated polyol molecule and y represents the average number of acyl groups (B) per acrylated and acylated polyol molecule. At least one and as many as n−1 (n is the maximum number of the hydroxyl functionalities in the polyol molecule (P)) can be acrylated in the acrylated and acylated polyol monomeric unit. At least one and as many as n−1 (n is the maximum number of the hydroxyl functionalities in the polyol molecule (P)) can be acylated in the acrylated and acylated polyol monomeric unit. For example, glycerol contains 3 hydroxyl groups, and thus, in the acrylated and acylated glycerol represented by $A_xB_yG$, x can range from greater than 0 to 2.9 and y can range from greater than 0 to 2.9. Likewise, sorbitol contains 6 hydroxyl groups, and thus, in the acrylated and acylated sorbitol represented by $A_xB_yS$, x can range from greater than 0 to 5.9 and y can range from greater than 0 to 5.9. In the monomeric acrylated and acylated polyol $A_xB_yP$, there can be a mixture of various acrylated and acylated polyols with different degrees of acrylation and acylation. For example, in the case of acrylated and acylated glycerol of formula $A_1B_1G$, while the majority monomeric acrylated and acylated polyol units may be mono-acrylated and mono-acylated glycerol $(A_1B_1G)$, there can also be small populations of acrylated and acylated polyol monomeric units that are non-acrylated and non-acylated glycerol $(A_0B_0G)$, non-acrylated and mono-acylated glycerol $(A_0B_1G)$, mono-acrylated and non-acylated glycerol $(A_1B_0G)$, mono-acrylated and di-acylated glycerol $(A_1B_2G)$, and di-acrylated and mono-acylated glycerol $(A_2B_1G)$ and etc. as well. Moreover, the monomeric $A_xB_yP$ can also possess a small number of oligomers of acrylated and acylated polyols, as the autopolymerization of the acrylic groups may not be completely suppressed. Accordingly, while $A_xB_yP$ is referred to as "monomers" herein, it is to be understood that these monomeric units can contain mixtures having a distributions of various degree of acrylation and acylation and various molecular weight.

Exemplary acrylated and acylated polyol monomeric units are acrylated and acylated glycerol, acrylated and acylated sorbitol, acrylated and acylated isosorbide, and acrylated and acylated dextrose. The average degree of acrylation in acrylated and acylated glycerol can range from 0.001 to 2.9. The average degree of acylation in acrylated and acylated glycerol can range from 0.001 to 2.9. The average degree of acrylation in acrylated and acylated sorbitol can range from 0.001 to 5.9. The average degree of acylation in acrylated and acylated sorbitol can range from 0.001 to 5.9. The average degree of acrylation in acrylated and acylated isosorbide can range from 0.001 to 2. The average degree of acylation in acrylated and acylated isosorbide can range from 0.001 to 2. The average degree of acrylation in acrylated and acylated dextrose can range from 0.001 to 4.9. The average degree of acylation in acrylated and acylated dextrose can range from 0.001 to 4.9.

The acrylated and acetalized polyol monomeric unit can be represented by $A_xC_zP$, in which x represents the average number of acrylic groups (A) per acrylated and acetalized polyol molecule and z represents the average number of acetal groups (C) per acrylated and acetalized polyol molecule. At least one and as many as n−1 (n is the maximum number of the hydroxyl functionalities in the polyol molecule (P)) can be acrylated in the acrylated and acetalized polyol monomeric unit. At least one and as many as n−1 (n is the maximum number of the hydroxyl functionalities in the polyol molecule (P)) can be acetalized in the acrylated and acetalized polyol monomeric unit. For example, glycerol contains 3 hydroxyl groups, and thus, in the acrylated and acetalized glycerol represented by $A_xC_zG$, x can range from greater than 0 to 2.9 and z can range from greater than 0 to 1. Likewise, sorbitol contains 6 hydroxyl groups, and thus, in the acrylated and acetalized sorbitol represented by $A_xC_zS$, x can range from greater than 0 to 5.9 and z can range from greater than 0 to 3. In the monomeric acrylated and acetalized polyol $A_xC_zP$, there can be a mixture of various acrylated and acetalized polyol with different degrees of acrylation and acetalization. For example, in the case of acrylated and acetalized glycerol of formula $A_1C_1G$, while the majority monomeric acrylated and acetalized polyol units may be mono-acrylated and mono-acetalized glycerol $(A_1C_1G)$, there can also be small populations of acrylated and acetalized polyol monomeric units that are non-acrylated and non-acetalized glycerol $(A_0C_0G)$, non-acrylated and mono-acetalized glycerol $(A_0C_1G)$, mono-acrylated and non-acetalized glycerol $(A_1C_0G)$, and etc. as well. Moreover, the monomeric $A_xC_zP$ can also possess a small number of oligomers of acrylated and acetalized polyols, as the autopolymerization of the acrylic groups may not be completely suppressed. Accordingly, while $A_xC_zP$ is referred to as "monomers" herein, it is to be understood that these monomeric units can contain mixtures having a distributions of various degree of acrylation and acetalization and various molecular weight.

Exemplary acrylated and acetalized polyol monomeric units are acrylated and acetalized glycerol, acrylated and acetalized sorbitol, acrylated and acetalized isosorbide, and acrylated and acetalized dextrose. The average degree of acrylation in acrylated and acetalized glycerol can range from 0.001 to 2.9. The average degree of acetalization in acrylated and acetalized glycerol can range from 0.001 to 1. The average degree of acrylation in acrylated and acetalized sorbitol can range from 0.001 to 5.9. The average degree of acetalization in acrylated and acetalized sorbitol can range from 0.001 to 3. The average degree of acrylation in acrylated and acetalized isosorbide can range from 0.001 to 2. The average degree of acetalization in acrylated and acetalized isosorbide can range from 0.001 to 2. The average degree of acrylation in acrylated and acetalized dextrose can range from 0.001 to 4.9. The average degree of acetalization in acrylated and acetalized dextrose can range from 0.001 to 2.

The structure of an exemplary acrylated and acylated polyol is shown in Formula 1.

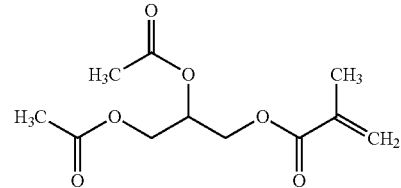

Formula 1

Acetylated Methacrylated Glycerol (AMG)

The structure of an exemplary acrylated and acetalized polyol is shown in Formula 2.

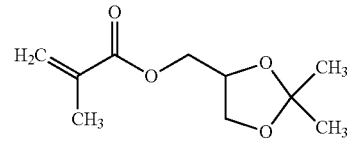

Formula 2

Solketal Methacrylate

The structure of an exemplary acrylated and acetalized polyol is shown in Formula 3.

Formula 3

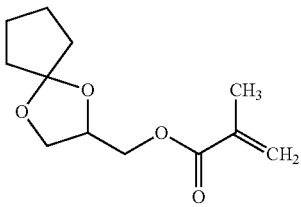

1,4-Dioxaspiro [4,4] nona-2-yl methyl methacrylate (GCM)

The structure of an exemplary acrylated and acetalized polyol is shown in Formula 4.

Formula 4

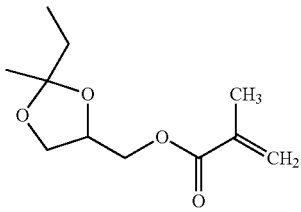

(2-Ethyl-2-methyl-1,3-diaxolan-4-yl) methyl methacrylate (GMM)

One or more acrylated and acylated or acetalized polyol monomeric units in the homopolymer, copolymer, block copolymer, or statistical copolymer can also contain one or more alkoxy groups, which can be derived from esterification of the un-acrylated and un-acylated or un-acetalized hydroxy groups in the acrylated and acylated or acetalized polyol. For instance, one or more acrylated and acylated or acetalized polyol monomeric units in the homopolymer, copolymer, block copolymer, or statistical copolymer contain one or more methoxy or ethoxy groups.

One or more acrylated and acylated or acetalized polyol monomeric units of the PA block can contain one or more alkoxy groups.

The PB block can be polymerized from one or more radically polymerizable monomers, which can include a variety type of monomers such as vinyl (such as vinyl aromatic), acrylic (such as methacrylates, acrylates, methacrylamides, acrylamides, etc.), diolefin, nitrile, dinitrile, acrylonitrile monomer, a monomer with reactive functionality, and a crosslinking monomer.

Vinyl aromatic monomers are exemplary vinyl monomers that can be used in the PB block, and include any vinyl aromatics optionally having one or more substituents on the aromatic moiety. The aromatic moiety can be either mono- or polycyclic. Exemplary vinyl aromatic monomers for the PB block include styrene, α-methyl styrene, t-butyl styrene, vinyl xylene, vinyl naphthalene, vinyl pyridine, divinyl benzene, N-vinyl heteroaromatics (such as 4-vinylimidazole (Vim), N-vinylcarbazole (NVC), N-vinylpyrrolidone, etc.). Other exemplary vinyls include vinyl esters (such as vinyl acetate (VAc), vinyl butyrate (VB), vinyl benzoate (VBz)), N-vinyl amides and imides (such as N-vinylcaprolactam (NVCL), N-vinylpyrrolidone (NVP), N-vinylphthalimide (NVPI), etc.), vinylsulfonates (such as 1-butyl ethenesulfonate (BES), neopentyl ethenesulfonate (NES), etc.), vinylphosphonic acid (VPA), haloolefins (such as vinylidene fluoride (VF2)), etc. Exemplary methacrylates include $C_1$-$C_6$ (meth)acrylate (i.e., methyl methacrylate, ethyl methacrylate, propyl (meth)acrylate, butyl (meth)acrylate, isobutyl methacrylate, heptyl (meth)acrylate, or hexyl (meth)acrylate), 2-(acetoacetoxy)ethyl methacrylate (AAEMA), 2-aminoethyl methacrylate (hydrochloride) (AEMA), allyl methacrylate (AMA), cholesteryl methacrylate (CMA), t-butyldimethylsilyl methacrylate (BDSMA), (diethylene glycol monomethyl ether) methacrylate (DEGMA), 2-(dimethylamino)ethyl methacrylate (DMAEMA), (ethylene glycol monomethyl ether) methacrylate (EGMA), 2-hydroxyethyl methacrylate (HEMA), dodecyl methacrylate (LMA), methacryloyloxyethyl phosphorylcholine (MPC), (poly(ethylene glycol) monomethyl ether) methacrylate (PEGMA), pentafluorophenyl methacrylate (PFPMA), 2-(trimethylamonium)ethyl methacrylate (TMAEMA), 3-(trimethylamonium)propyl methacrylate (TMAPMA), triphenylmethyl methacrylate (TPMMA), etc. Other exemplary acrylates include 2-(acryloyloxy)ethyl phosphate (AEP), butyl acrylate (BA), 3-chloropropyl acrylate (CPA), dodecyl acrylate (DA), di(ethylene glycol) 2-ethylhexyl ether acrylate (DEHEA), 2-(dimethylamino) ethyl acrylate (DMAEA), ethyl acrylate (EA), ethyl α-acetoxyacrylate (EAA), ethoxyethyl acrylate (EEA), 2-ethylhexyl acrylate (EHA), isobornyl acrylate (iBoA), methyl acrylate (MA), propargyl acrylate (PA), (poly(ethylene glycol) monomethyl ether) acrylate (PEGA), tert-butyl acrylate (tBA), etc. Exemplary methacrylamides include N-(2-aminoethyl)methacrylamide (hydrochloride) (AEMAm) and N-(3-aminopropyl)methacrylamide (hydrochloride) (APMAm), N-(2-(dimethylamino)ethyl)acrylamide (DEAPMAm), N-(3-(dimethylamino)propyl)methacrylamide (hydrochloride) (DMAPMAm), etc. Other exemplary acrylamides include acrylamide (Am), 2-acrylamido-2-methylpropanesulfonic acid sodium salt (AMPS), N-benzylacrylamide (BzAm), N-cyclohexylacrylamide (CHAm), diacetone acrylamide (N-(1,1-dimethyl-3-oxobutyl) acrylamide) (DAAm), N,N-diethylacrylamide (DEAm), N,N-dimethylacrylamide (DMAm), N-(2-(dimethylamino)ethyl) acrylamide (DMAEAm), N-isopropylacrylamide (NIPAm), N-octylacrylamide (OAm), etc. Exemplary nitriles include acrylonitrile, adiponitrile, methacrylonitrile, etc. Exemplary diolefins include butadiene, isoprene, etc.

The radically polymerizable monomers suitable for usage herein also include those monomers with reactive functionality, e.g., a 'clickable' functionality so that when the monomers are incorporated in blocks, these 'clickable' functional groups can be used as a precursor to a polymer brush or copolymerized to provide sites for the attachment of functionality or for crosslinking. Exemplary reactive functionality include functional groups suitable for azide-alkyne 1,3-dipolar cycloaddition, such as azide functionality; "active ester' functional groups that are particular active with primary amine functionality; functional groups with protected thiol, hydrazide or amino functionality; functional groups with isocyanate or isothiocyanate functionality, etc.

The radically polymerizable monomers suitable for usage herein can also include those crosslinking monomers that are typically used both in the synthesis of microgels and polymer networks. The monomers can include degradable crosslinks such as an acetal linkage, or disulfide linkages, resulting in the formation of degradable crosslinks. Exemplary crosslinking monomers diethyleneglycol dimethacrylate (DEGDMA), triethylene glycol dimethacrylate (TEGDMA), ethyleneglycol dimethacrylate (EGDMA), hexane-1,6-diol diacrylate (HDDA), methylene-bis-acrylamide (MBAm), divinylbenzene (DVB), etc.

A more extensive list of exemplary methacrylate monomers, acrylate monomers, methacrylamide monomers, acrylamide monomers, styrenic monomers, diene monomers, vinyl monomers, monomers with reactive functionality, and crosslinking monomers that are suitable for usage as the radically polymerizable monomers herein has been described in Moad et al., "Living Radical Polymerization by the Raft Process—a Third Update," *Australian Journal of Chemistry* 65: 985-1076 (2012), which is hereby incorporated by reference in its entirety.

Moreover, two or more different monomers can be used together in the formation of the PB block or different PB block in the block copolymer. A typical radically polymerizable monomer B used herein is styrene, and the resulting PB block is a styrene homopolymer. Another typical radically polymerizable monomer B used herein is methyl acrylate, and the resulting PB block is a methyl acrylate homopolymer.

The PB block can also be polymerized from one or more monomeric triglycerides, typically derived from a plant oil, animal fat, or a synthetic triglyceride. This polymerized plant oil or animal oil can be subsequently partially or fully saturated via a catalytic hydrogenation post-polymerization. The monomeric oils used in the PB block can be any triglycerides or triglyceride mixtures that are radically polymerizable. These triglycerides or triglyceride mixtures are typically plant oils. Suitable plant oils include, but are not limited to, a variety of vegetable oils such as soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. Typical vegetable oil used herein includes soybean oil, linseed oil, corn oil, flax seed oil, or rapeseed oil, and the resulting PB block is polymerized triglyceride or triglyceride derivatives.

Any monomer that is suitable to form the PB block can be used to form the PC block.

Monomer B or monomer C can be each independently a vinyl, acrylic, diolefin, nitrile, dinitrile, acrylonitrile monomer, or monomer with reactive functionality, or crosslinking monomer. The exemplary embodiments for monomer B and monomer C suitable for usage in the statistical copolymer are the same as the exemplary embodiments for the monomer B, as described above in the block copolymer. Exemplary monomer B and monomer C include styrene, α-methyl styrene, t-butyl styrene, vinyl xylene, vinyl naphthalene, vinyl pyridine, divinyl benzene, vinyl acetate, N-vinylpyrrolidone, methyl acrylate, $C_1$-$C_6$ (meth)acrylate (i.e., methyl methacrylate, ethyl methacrylate, propyl (meth)acrylate, butyl (meth)acrylate, heptyl (meth)acrylate, or hexyl (meth)acrylate), acrylonitrile, adiponitrile, methacrylonitrile, butadiene, isoprene, radically polymerizable plant oils, or mixtures thereof. For example, the monomer B and the monomer C are each independently a vinyl aromatic monomer, such as a styrene; an acrylate monomer, such as a methyl (meth)acrylate; or a radically polymerizable plant oil, such as soybean oil, linseed oil, corn oil, flax seed oil, or rapeseed oil.

Another aspect of the present invention relates to a method of making a homopolymer or copolymer. The method comprises providing an acrylated and acylated or acetalized polyol composition comprising plural polyol monomeric units. The polyol monomeric units being acrylated and acylated or acetalized. The acrylated and acylated or acetalized polyol composition has an average degree of acrylation which is 1 or more, but less than the number of the hydroxyl groups of the polyol and have an average degree of acylation or acetalization which is 1 or more, but less than the number of the hydroxyl groups of the polyol. The method also comprises polymerizing the acrylated and acylated or acetalized polyol composition, through controlled radical polymerization, to form the homopolymer or copolymer.

In some embodiments, the acrylated and acylated or acetalized polyol monomeric units have the same degree of acrylation and acylation or acetalization of hydroxyl groups.

In some embodiments, the acrylated and acylated or acetalized polyol monomeric units have different degrees of acrylation and acylation or acetalization of hydroxyl groups.

In one embodiment, the homopolymer, copolymer, or block copolymer is a thermoplastic homopolymer, copolymer, or block copolymer.

In another embodiment, the homopolymer, copolymer, or block copolymer is a thermosetting homopolymer, copolymer, or block copolymer.

In one embodiment, polymerizing is carried out in a solvent with the monomer having a concentration, when dissolved in the solvent, ranging from 1% to 90%.

In one embodiment, the method comprises providing an acrylated and acylated polyol composition comprising plural polyol monomeric units. The polyol monomeric units are acrylated and acylated. The acrylated and acylated polyol composition has an average degree of acrylation which is 1 or more, but less than the number of the hydroxyl groups of the polyol and have an average degree of acylation which is 1 or more, but less than the number of the hydroxyl groups of the polyol and polymerizing the acrylated and acylated polyol composition, through controlled radical polymerization, to form the homopolymer or copolymer.

An acrylated and acylated polyol composition can be prepared by reacting the acrylated polyol with an acylating reagent.

The acylating reagent used can be a carboxylic acid, carboxylic acid anhydride, or acidic halide. Suitable acylating reagents include, but are not limited to, acetic acid, acetic anhydride, acyl chloride, acyl bromide, and acyl iodide.

The acylating reagent is typically added in excess of the acrylated polyol. The amount of the acylating reagent added may depend upon the desirable degree of acylation: the more excessive of the acylating reagent relative to the acrylated polyol, the larger degree of acylation will be achieved. Typically, the stoichiometric ratio of the acylating reagent to the acrylated polyol can range from 1 to the maximum number of the hydroxyl functionalities in the acrylated polyol molecule. For instance, the stoichiometric ratio of the acylating reagent to acylated acrylated glycerol typically ranges from 1 to 2.

The acylation reaction is typically carried out at a temperature of 0° C. to 130° C., at a temperature of 50° C. to 110° C., or at a temperature of 90° C. to 110° C.

An acrylated polyol composition can be prepared by reacting a polyol with an acrylic reagent. Polyols are acrylated through a standard acid- or base-catalyzed condensation reaction. This reaction typically occurs at a mild temperature and produces water as the non-recyclable waste product. The reaction imparts acrylic functionality to the polyol molecule, rendering it to be readily polymerized and to interact with other rubber-like polymers such as polymers having backbones that contain tire rubber.

The acrylic reagent used can be an unsaturated carboxylic acid, unsaturated carboxylic acid anhydride, or an acidic halide. Suitable acrylic reagents include, but are not limited to, acrylic acid, acryloyl chloride, acrylic anhydride, methacrylic acid, methacrylic anhydride, acidic halide, and unsaturated carboxylic acid anhydride terminated with a vinyl.

The acrylic reagent is typically added in excess of the polyol. The amount of the acrylic reagent added may depend upon the desirable degree of acrylation: the more excessive of the acrylic reagent relative to the polyol, the larger degree of acrylation will be achieved. Typically, the stoichiometric ratio of the acrylic reagent to the polyol can range from 1 to the maximum number of the hydroxyl functionalities in the polyol molecule. For instance, the stoichiometric ratio of the acrylic reagent to glycerol typically ranges from 1 to 3.

The acrylation reaction is typically carried out at a temperature of 30° C. to 130° C., at a temperature of 50° C. to 110° C., or at a temperature of 90° C. to 110° C. The acrylation reaction can be carried out in the presence of a catalyst. Suitable catalysts include, but are not limited to, a homogeneous catalyst such as triphenyl phosphine or triamine pyrophosphate, or a heterogeneous polyanionic resin, such as the Amberlyst™ family (e.g., amberlyst 15). The acrylation reaction can be carried out in the presence of an inhibitor. Exemplary inhibitors include, but are not limited to, phenothiazine, hydroquinone, or antioxidant inhibitors such as the ETHANOX family (e.g., ETHANOX 330™).

The side reactions in the acrylation process can promote the joining of mono-acrylated polyol, di-acrylated polyol, or other multi-acrylated polyol to form larger molecules known as oligomers. The acrylated glycerol monomer or oligomers may be further polymerized.

An acrylated and acylated polyol composition can also be prepared by reacting the acylated polyol with an acrylic reagent. Acylated polyols are acrylated through a standard acid- or base-catalyzed condensation reaction. This reaction typically occurs at a mild temperature and produces water as the non-recyclable waste product. The reaction imparts acrylic functionality to the polyol molecule, rendering it to be readily polymerized and to interact with other rubber-like polymers such as polymers having backbones that contain tire rubber.

The acrylic reagent used can be an unsaturated carboxylic acid, unsaturated carboxylic acid anhydride, or an acidic halide. Suitable acrylic reagents include, but are not limited to, acrylic acid, acryloyl chloride, acrylic anhydride, methacrylic acid, methacrylic anhydride, acidic halide, and unsaturated carboxylic acid anhydride terminated with a vinyl.

The acrylic reagent is typically added in excess of the acylated polyol. The amount of the acrylic reagent added may depend upon the desirable degree of acrylation: the more excessive of the acrylic reagent relative to the acylated polyol, the larger degree of acrylation will be achieved. Typically, the stoichiometric ratio of the acrylic reagent to the acylated polyol can range from 1 to the maximum number of the hydroxyl functionalities in the acylated polyol molecule. For instance, the stoichiometric ratio of the acrylic reagent to acylated glycerol typically ranges from 1 to 2.

An acylated polyol composition can be prepared by reacting a polyol with an acylating reagent.

The acylating reagent used can be a carboxylic acid, carboxylic acid anhydride, or acidic halide. Suitable acylating reagents include, but are not limited to, acetic acid, acetic anhydride, acyl chloride, acyl bromide, and acyl iodide.

The acylating reagent is typically added in excess of the polyol. The amount of the acylating reagent added may depend upon the desirable degree of acylation: the more excessive of the acylating reagent relative to the polyol, the larger degree of acylation will be achieved. Typically, the stoichiometric ratio of the acylating reagent to the polyol can range from 1 to the maximum number of the hydroxyl functionalities in the polyol molecule. For instance, the stoichiometric ratio of the acylating reagent to glycerol typically ranges from 1 to 3.

The acylation reaction is typically carried out at a temperature of 0° C. to 130° C., at a temperature of 50° C. to 110° C., or at a temperature of 90° C. to 110° C.

In another embodiment, the method comprises providing an acrylated and acetalized polyol composition comprising plural polyol monomeric units. The polyol monomeric units being acrylated and acetalized. The acrylated and acetalized polyol composition has an average degree of acrylation which is 1 or more, less than the number of the hydroxyl groups of the polyol and have an average degree of acetalization which is 1 or more, but less than the number of the hydroxyl groups of the polyol and polymerizing the acrylated and acylated polyol composition, through controlled radical polymerization, to form the homopolymer or copolymer.

An acrylated and acetalized polyol composition can be prepared by reacting the acrylated polyol with an acetalizating reagent.

The acetalizating reagent used can be an aldehyde or a ketone. Suitable acetalizating reagents include, but are not limited to, aliphatic aldehydes such as formaldehyde (including trimeric and polymeric paraformaldehyde), acetaldehyde (including trimeric paraacetaldehyde), propionaldehyde, butyraldehyde, isobutyraldehyde, pentylaldehyde, isopentylaldehyde, hexylaldehyde, 2-ethylhexylaldehyde, and cyclohexylaldehyde; aromatic aldehydes such as benzaldehyde, o-tolaldehyde, p-tolaldehyde, m-tolaldehyde, p-hydroxybenzaldehyde, salicylaldehyde; heterocyclic aldehydes such as furfural; and ketones such as acetone, methyl ethyl ketone, diethyl ketone, methyl benzyl ketone, methyl cyclohexyl ketone, diallyl ketone, hexanone, and cyclohexanone.

The acetalizating reagent is typically added in excess of the acrylated polyol. The amount of the acetalizating reagent added may depend upon the desirable degree of acetalization: the more excessive the acetalizating reagent relative to the polyol, the larger degree of acetalization will be achieved. Typically, the stoichiometric ratio of the acetalizating reagent to the acrylated polyol can range from 1 to the half of the maximum number of the hydroxyl functionalities in the acrylated polyol molecule. For instance, the stoichiometric ratio of the acetalizating reagent to glycerol typically ranges from 1 to 1.5.

The acetalization reaction is typically carried out at a temperature of 0° C. to 300° C., at a temperature of 0° C. to 200° C., or at a temperature of 90° C. to 110° C.

An acrylated and acetalized polyol composition can also be prepared by reacting the acetalized polyol with an acrylic reagent. Acetalized polyols are acrylated through a standard acid- or base-catalyzed condensation reaction. This reaction typically occurs at a mild temperature and produces water as the non-recyclable waste product. The reaction imparts acrylic functionality to the polyol molecule, rendering it to be readily polymerized and to interact with other rubber-like polymers such as polymers having backbones that contain tire rubber.

The acrylic reagent used can be an unsaturated carboxylic acid, unsaturated carboxylic acid anhydride, or an acidic halide. Suitable acrylic reagents include, but are not limited to, acrylic acid, acryloyl chloride, acrylic anhydride, methacrylic acid, methacrylic anhydride, acidic halide, and unsaturated carboxylic acid anhydride terminated with a vinyl.

The acrylic reagent is typically added in excess of the acetalized polyol. The amount of the acrylic reagent added may depend upon the desirable degree of acrylation: the more excessive of the acrylic reagent relative to the acetalized polyol, the larger degree of acrylation will be achieved. Typically, the stoichiometric ratio of the acrylic reagent to the acetalized polyol can range from 1 to the maximum number of the un-acetalized hydroxyl functionalities in the polyol molecule. For instance, the stoichiometric ratio of the acrylic reagent to mono acetalized glycerol typically ranges from 1 to 2.

An acetalized polyol composition can be prepared by reacting a polyol with an acetalizating reagent.

The acetalizating reagent used can be an aldehyde or a ketone. Suitable acetalizating reagents include, but are not limited to, aliphatic aldehydes such as formaldehyde (including trimeric and polymeric paraformaldehyde), acetaldehyde (including trimeric paraacetaldehyde), propionaldehyde, butyraldehyde, isobutyraldehyde, pentylaldehyde, isopentylaldehyde, hexylaldehyde, 2-ethylhexylaldehyde, and cyclohexylaldehyde; aromatic aldehydes such as benzaldehyde, o-tolaldehyde, p-tolaldehyde, m-tolaldehyde, p-hydroxybenzaldehyde, salicylaldehyde; heterocyclic aldehydes such as furfural; and ketones such as acetone, methyl ethyl ketone, diethyl ketone, methyl benzyl ketone, methyl cyclohexyl ketone, diallyl ketone, hexanone, and cyclohexanone.

The acetalizating reagent is typically added in excess of the polyol. The amount of the acetalizating reagent added may depend upon the desirable degree of acetalization: the more excessive of the acetalizating reagent relative to the polyol, the larger degree of acetalization will be achieved. Typically, the stoichiometric ratio of the acetalizating reagent to the polyol can range from 1 to the half of the maximum number of the hydroxyl functionalities in the polyol molecule. For instance, the stoichiometric ratio of the acetalizating reagent to glycerol typically ranges from 1 to 1.5.

The acetalization reaction is typically carried out at a temperature of 0° C. to 300° C., at a temperature of 0° C. to 200° C., or at a temperature of 90° C. to 110° C.

The acrylated and acylated or acetalized polyol composition can then be polymerized through, e.g., free radical, anionic, or controlled radical polymerization. Typically, controlled radical polymerization is conducted on the acrylated and acylated or acetalized polyol composition to form a homopolymer, copolymer, block copolymer, or statistical copolymer. The polymerizing step is carried out under conditions effective to produce the homopolymer, copolymer, block copolymer, or statistical copolymer with a molecular weight of at least 1 KDa without gelation. The resulting homopolymer, copolymer, block copolymer, or statistical copolymer has a linear or branched-chain structure.

The polymerizing step is performed through living free radical polymerization which involves living/controlled polymerization with free radical as the active polymer chain end (Moad et al., "The Chemistry of Radical Polymerization—Second Fully Revised Edition," Elsevier Science Ltd. (2006), which is hereby incorporated by reference in its entirety). This form of polymerization is a form of addition polymerization where the ability of a growing polymer chain to terminate has been removed. The rate of chain initiation is thus much larger than the rate of chain propagation. The result is that the polymer chains grow at a more constant rate than seen in traditional chain polymerization and their lengths remain very similar. The polymerizing step typically occurs in the presence of a free radical initiator, and a catalyst or a chain transfer agent to form the copolymer.

One form of living free radical polymerization is atom transfer radical polymerization. Atom transfer radical polymerization (ATRP) is a catalyzed, reversible redox process that achieves controlled polymerization via facile transfer of labile radicals (e.g., halide radicals) between growing polymer chains and a catalyst (Davis et al., "Atom Transfer Radical Polymerization of tert-Butyl Acrylate and Preparation of Block Copolymers," *Macromolecules* 33:4039-4047 (2000); Matyjaszewski et al., "Atom Transfer Radical Polymerization," *Chemical Reviews* 101:2921-2990 (2001), which are hereby incorporated by reference in their entirety). In ATRP, chain termination and transfer reactions are essentially eliminated by keeping the free radical concentration small. Briefly, the mechanism by which ATRP operates may be summarized as:

In Equation (1), the labile radical X may be a halogen (e.g., Br, Cl) attached to end of a polymer P. The catalyst, $Cu_IBr$, reversibly abstracts this halogen, forming a polymer free radical (P.). The equilibrium achieved between inert polymers and active polymer free radicals strongly favors the left side ($K<<10^{-8}$). Equation (2) is the standard free radical propagation reaction between a polymer of length i and a monomer M. The small free radical concentration ensured by equation (1) virtually eliminates termination reactions, and the halogen functionality is retained on polymers produced, which allows the production of copolymers from nearly any monomer amenable to conventional free radical polymerization.

The ATRP polymerization reaction starts with initiation. Initiation is accomplished by adding an agent capable of decomposing to form free radicals; the decomposed free radical fragment of the initiator attacks a monomer yielding a monomer-free radical, and ultimately produces an intermediate capable of propagating polymerization. These agents often are referred to as "initiators." The initiation is typically based on the reversible formation of growing radicals in a redox reaction between various transition metal compounds and an initiator.

Suitable initiators depend greatly on the details of the polymerization, including the types of monomers being used, the type of catalyst system, the solvent system and the reaction conditions. Simple organic halides are typically used as model halogen atom transfer initiators. Exemplary initiators are aralkyl halides or aryl halides, such as benzyl bromide or benzyl chloride.

In ATRP, the introduction of a catalyst system to the reaction media is required to establish the equilibrium between active states (active polymer free radicals for the growth of the polymer) and dormant states (the formed inert polymer). The catalyst is typically a transition metal compound being capable of participating in a redox cycle with the initiator and a dormant polymer chain. The transition-metal compound used herein is a transition-metal halide. Any transition metal that can participate in a redox cycle with the initiator and dormant polymer chain, but does not form a direct C-metal bond with the polymer chain, is suitable in the present invention. The exemplary transition metal includes $Cu^{1+}$, $Cu^{2+}$, $Fe^{2+}$, $Fe^{3+}$, $Ru^{2+}$, $Ru^{3+}$, $Ru^{4+}$, $Ru^{5+}$, $Ru^{6+}$, $Cr^{2+}$, $Cr^{3+}$, $Mo^{0}$, $Mo^{+}$, $Mo^{2+}$, $Mo^{3+}$, $W^{2+}$, $W^{3+}$, $Mn^{3+}$, $Mn^{4+}$, $Rh^{+}$, $Rh^{2+}$, $Rh^{3+}$, $Rh^{4+}$, $Re^{2+}$, $Re^{3+}$, $Re^{4+}$, $Co^{+}$, $Co^{2+}$, $Co^{3+}$, $V^{2+}$, $V^{3+}$, $V^{4+}$, $V^{5+}$, $Zn^{+}$, $Zn^{2+}$, $Au^{+}$, $Au^{2+}$, $Au^{3+}$, $Hg^{+}$, $Hg^{2+}$, $Pd^{0}$, $Pd^{+}$, $Pd^{2+}$, $Pt^{0}$, $Pt^{+}$, $Pt^{2+}$, $Pt^{3+}$, $Pt^{4+}$, $Ir^{0}$, $Ir^{+}$, $Ir^{2+}$, $Ir^{3+}$, $Ir^{4+}$, $Os^{2+}$, $Os^{3+}$, $Os^{4+}$, $Nb^{2+}$, $Nb^{3+}$, $Nb^{4+}$, $Nb^{5+}$, $Ta^{3+}$, $Ta^{4+}$, $Ta^{5+}$, $Ni^{0}$, $Ni^{+}$, $Ni^{2+}$, $Ni^{3+}$, $Nd^{0}$, $Nd^{+}$, $Nd^{2+}$, $Nd^{3+}$, $Ag^{+}$, and $Ag^{2+}$. A typical transition-metal catalyst system used herein is $CuCl/CuCl_2$.

The ligand serves to coordinate with the transition metal compound such that direct bonds between the transition metal and growing polymer radicals are not formed, and the formed copolymer are isolated. The ligand can be any N-, O-, P- or S-containing compound that coordinates with the transition metal to form a σ-bond, any C-containing compound that coordinates with the transition metal to form a π-bond, or any C-containing compound that coordinates with the transition metal to form a C-transition metal σ-bond but does not form a C—C bond with the monomers under the polymerizing conditions. A typical ligand used herein is pentamethyldiethylene-triamine (PMDETA).

The state of the art of ATRP has been reviewed by Matyjaszewski (Matyjaszewski et al., "Atom Transfer Radical Polymerization," *Chemical Reviews* 101:2921-2990 (2001), which is hereby incorporated by reference in its entirety). More details for selection of initiators and catalysts/ligand system for ATRP reaction can be found in U.S. Pat. No. 5,763,548 to Matyjaszewski et al. and U.S. Pat. No. 6,538,091 to Matyjaszewski et al., which are hereby incorporated by reference in their entirety. Detailed descriptions for ATRP polymerization of a similar system, conjugated vegetable oil-based thermoplastic copolymer, can be found in U.S. Patent Application Publication No. US 2013/0184383 Alto Cochran et al., which is hereby incorporated by reference in its entirety.

Some embodiments of the present invention relates to a method of making a homopolymer or copolymer via ATRP. The method comprises providing an acrylated and acylated or acetalized polyol composition comprising plural polyol monomeric units. The polyol monomeric units being acrylated and acylated or acetalized. The acrylated and acylated or acetalized polyol composition has an average degree of acrylation which is 1 or more, but less than the number of the hydroxyl groups of the polyol and have an average degree of acylation or acetalization which is 1 or more, but less than the number of the hydroxyl groups of the polyol. The method also comprises polymerizing the acrylated and acylated or acetalized polyol composition, through ATRP to form the homopolymer or copolymer.

In some embodiment, an acrylated and acylated or acetalized polyol composition is an acrylated and acylated polyol composition comprising plural polyol monomeric units, said polyol monomeric units being acrylated and acylated. The acrylated and acylated polyol composition has an average degree of acrylation which is 1 or more, but less than the number of the hydroxyl groups of the polyol and have an average degree of acylation which is 1 or more, but less than the number of the hydroxyl groups of the polyol.

In some embodiment, an acrylated and acylated or acetalized polyol composition is an acrylated and acetalized polyol composition comprising plural polyol monomeric units, said polyol monomeric units being acrylated and acetalized The acrylated and acetalized polyol composition has an average degree of acrylation which is 1 or more, but less than the number of the hydroxyl groups of the polyol and have an average degree of acetalization which is 1 or more, but less than the number of the hydroxyl groups of the polyol.

In other embodiments, the present invention relates to a method of making a block copolymer via ATRP. The method comprises providing an acrylated and acylated or acetalized polyol composition comprising plural polyol monomeric units. The polyol monomeric units being acrylated and acylated or acetalized. The acrylated and acylated or acetalized polyol composition has an average degree of acrylation which is 1 or more, but less than the number of the hydroxyl groups of the polyol and have an average degree of acylation or acetalization which is 1 or more, but less than the number of the hydroxyl groups of the polyol. The method also comprises polymerizing the acrylated and acylated or acetalized polyol composition through controlled radical polymerization in the presence of a solvent, a catalyst, a counter catalyst, a macromolecular initiator, and a ligand to form the block copolymer. The method can further comprise the providing a radically polymerizable monomer different than the acrylated and acylated or acetalized polyol monomeric unit; and polymerizing the radically polymerizable monomer through atom transfer radical polymerization (ATRP) with the block copolymer as a macromolecular free radical initiator to add an additional block to the block copolymer.

The formed block copolymer based on poly (acrylated and acylated or acetalized polyol) can be used as a macromolecular free radical initiator to add additional polymer block. Thus, the method can further comprise providing a radically polymerizable monomer different than the acrylated and acylated or acetalized polyol monomeric unit; and polymerizing the radically polymerizable monomer with the formed block copolymer as a macromolecular free radical initiator to add an additional block to the block copolymer. The radically polymerizable monomer suitable for usage in the method are the same as the exemplary embodiments for the monomer B, as described above in the block copolymer.

Temperatures for the ATRP polymerization of the acrylated and acylated or acetalized polyols can range from room temperature to 180° C. Typical reaction temperatures for the ATRP reaction of the acrylated and acylated or acetalized polyols is 120° C. or lower, for instance, from 50 to 120° C., or from 50 to 85° C.

The solvent used in the ATRP polymerization of the acrylated and acylated or acetalized polyols may be toluene, THF, chloroform, cyclohexane, 1,4-dioxane, dimethoxyethane, di-tert-butyl ether, diethyl ether, diisopropyl ether, 2-methyltetrahydrofuran, tetrahydropyran, or any other ether based solvent or a mixture thereof. A typical solvent used in the ATRP polymerization of the acrylated and acylated or acetalized polyols may be toluene, THF, chloroform, cyclohexane, or a mixture thereof.

In one embodiment, ATRP polymerization of the acrylated and acylated or acetalized polyols is carried out in the presence of a catalyst. The catalyst that can be used can be a transition-metal compound.

In another embodiment, ATRP polymerization of the acrylated and acylated or acetalized polyols is carried out in the presence of an initiator. The initiator that can be used can be an aryl halide or an aryalkyl halide. Typically, the initiator is benzyl chloride or benzyl chloride.

In another embodiment, ATRP polymerization of the acrylated and acylated or acetalized polyols is carried out in the presence of a ligand. The ligand that can be used can be a N-, O-, P-, or S-containing compound capable of coordinating with a transition metal in a form of σ- or π-bond. Typically, the ligand is pentamethyldiethylenetriamine (PMDETA).

One form of living free radical polymerization is Radical Addition-Fragmentation Chain Transfer (RAFT). Radical Addition-Fragmentation Chain Transfer (RAFT) polymerization is a type of living polymerization or controlled polymerization, utilizing a chain transfer agent (CTA). Conventional RAFT polymerization mechanism, consisting of a sequence of addition-fragmentation equilibria, is described in Moad et al., "Living Radical Polymerization by the Raft Process—a First Update," *Australian Journal of Chemistry* 59: 669-92 (2006), which is incorporated herein by reference in its entirety. The RAFT polymerization reaction starts with initiation. Initiation is accomplished by adding an agent capable of decomposing to form free radicals; the decomposed free radical fragment of the initiator attacks a monomer yielding a propagating radical ($P \cdot_n$), in which additional monomers are added producing a growing polymer chain. In the propagation step, the propagating radical ($P \cdot_n$) adds to a chain transfer agent (CTA), followed by the fragmentation of the intermediate radical forming a dormant polymer chain and a new radical (R·). This radical (R·) reacts with a new monomer molecule forming a new propagating radical ($P \cdot_m$). In the chain propagation step, ($P \cdot_n$) and ($P \cdot_m$) reach equilibrium and the dormant polymer chain provides an equal probability to all polymers chains to grow at the same rate, allowing polymers to be synthesized with narrow polydispersity. Termination is limited in RAFT, and, if occurring, is negligible. Targeting a specific molecular weight in RAFT can be calculated by multiplying the ratio of monomer consumed to the concentration of CTA used by the molecular weight of the monomer.

The initiating agents often are referred to as "initiators." Suitable initiators depend greatly on the details of the polymerization, including the types of monomers being used, the type of catalyst system, the solvent system, and the reaction conditions. A typical radical initiator can be azo compounds, which provide a two-carbon centered radical. Radical initiators such as benzoyl peroxide, azobisisobutyronitrile (AIBN), 1,1' azobis(cyclohexanecarbonitrile) or (ABCN), or 4,4'-Azobis(4-cyanovaleric acid) (ACVA); redox initiator such as benzoyl peroxide/N,N-dimethylaniline; microwave heating initiator; photoinitiator such as (2,4,6-trimethylbenzoyl)-diphenylphosphine oxide; gamma radiation initiator; or lewis acids such as scandium(III) triflate or yttrium (III) triflate, are typically used in RAFT polymerization.

RAFT polymerization can use a wide variety of CTA agents. Suitable CTA agents should be capable of initiating the polymerization of the monomers (styrene and AESO) and achieve a narrow polydispersity in the process. For a RAFT polymerization to be efficient, the initial CTA agents and the polymer RAFT agent should have a reactive C=S double bond; the intermediate radical should fragment rapidly without side reactions; the intermediate should partition in favor of products, and the expelled radicals (R.) should efficiently re-initiate polymerization. Suitable CTA agent is typically a thiocarbonylthio compound (ZC(=S)SR:

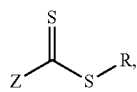

where R is free radical leaving group and Z is a group that modifies addition and fragmentation rates of RAFT polymerization. Exemplary CTA agents include, but are not limited to, a dithioester compound (where Z=aryl, heteraryl, or alkyl), a trithiocarbonate compound (where Z=alkylthio, arylthio, or heteroarylthio), a dithiocarbamate compound (where Z=arylamine or heterarylamine or alkylamine), and a xantate compound (where Z=alkoxy, aryloxy, or heteroaryloxy), that are capable or reversible association with polymerizable free radicals. Z can also be sulfonyl, phosphonate, or phosphine. A more extensive list of suitable CTA agents (or RAFT agents) can be found in Moad et al., "Living Radical Polymerization by the Raft Process—a First Update," *Australian Journal of Chemistry* 59: 669-92 (2006); Moad et al., "Living Radical Polymerization by the Raft Process—a Second Update," *Australian Journal of Chemistry* 62(11):1402-72 (2009); Moad et al., "Living Radical Polymerization by the Raft Process—a Third Update," *Australian Journal of Chemistry* 65: 985-1076 (2012); Skey et al., "Facile one pot synthesis of a range of reversible addition-fragmentation chain transfer (RAFT) agents." *Chemical Communications* 35: 4183-85 (2008), which are hereby incorporated by reference in their entirety. Effectiveness of the CTA agent depends on the monomer being used and is determined by the properties of the free radical leaving group R and the Z group. These groups activate and deactivate the thiocarbonyl double bond of the RAFT agent and modify the stability of the intermediate radicals (Moad et al., "Living Radical Polymerization by the Raft Process—a Second Update," *Australian Journal of Chemistry* 62(11):1402-72 (2009), which is hereby incorporated by reference in its entirety). Typical CTA agents used are 1-phenylethyl benzodithioate or 1-phenylethyl 2-phenylpropanedithioate.

More details for selection of initiators, chain transfer agents, and other reaction conditions for RAFT reaction as well as detailed descriptions for RAFT polymerization of a similar system, conjugated vegetable oil-based thermoplastic copolymer, can be found in U.S. Patent Application Publication No. US2014/0343192 A1 to Cochran et al., which is hereby incorporated by reference in its entirety.

Some embodiments of the present invention relates to a method of making a homopolymer and copolymer via RAFT. The method comprises providing an acrylated and acylated or acetalized polyol composition comprising plural polyol monomeric units. The polyol monomeric units being acrylated and acylated or acetalized. The acrylated and acylated or acetalized polyol composition has an average degree of acrylation which is 1 or more, but less than the number of the hydroxyl groups of the polyol and have an average degree of acylation or acetalization which is 1 or more, but less than the number of the hydroxyl groups of the polyol. The method also comprises polymerizing the acrylated and acylated or acetalized polyol composition RAFT, in the presence of a free radical initiator, a solvent, and a chain transfer agent.

In some other embodiments, the present invention relates to a method of making a block copolymer via RAFT. The method comprises providing an acrylated and acylated or acetalized polyol composition comprising plural polyol monomeric units. The polyol monomeric units being acrylated and acylated or acetalized. The acrylated and acylated or acetalized polyol composition has an average degree of acrylation which is 1 or more, but less than the number of the hydroxyl groups of the polyol and have an average degree of acylation or acetalization which is 1 or more, but less than the number of the hydroxyl groups of the polyol.

The method also comprises polymerizing the acrylated and acylated or acetalized polyol composition via RAFT, in the presence of a free radical initiator, a solvent, and a chain transfer agent to form the block copolymer. The method can further comprise providing a radically polymerizable monomer different than the acrylated and acylated or acetalized polyol monomeric unit, and polymerizing the radically polymerizable monomer via RAFT with the formed block copolymer as a macromolecular free radical initiator to add an additional block to the block copolymer.

In some embodiments, polymerizing is carried out in the presence of a free radical initiator, a solvent, and a macromolecular chain transfer agent to form the block copolymer.

The formed block copolymer based on poly (acrylated and acylated or acetalized polyol) can be used as a macromolecular free radical initiator to add additional polymer block. Thus, the method can further comprise providing a radically polymerizable monomer different than the acrylated polyol monomeric unit; and polymerizing the radically polymerizable monomer with the formed block copolymer as a macromolecular chain transfer agent to add an additional block to the block copolymer. The radically polymerizable monomer suitable for usage in the method are the same as the exemplary embodiments for the monomer B, as described above in the block copolymer.

In one embodiment, polymerizing the acrylated and acylated or acetalized polyol is carried out by RAFT polymerization. In RAFT polymerization, reaction time, temperature, and solvent concentration should be chosen appropriately to ensure the production of non-crosslinked elastomers. Reaction time relates closely to the temperature the reaction is carried out at: higher temperature requires shorter reaction times and lower temperature requires longer reaction times. Monitoring the time of the polymerization of the acrylated and acylated or acetalized polyol is crucial as reacting the acrylated and acylated or acetalized polyol too long causes the polymer to crosslink; whereas reacting the acrylated and acylated or acetalized polyol for too short causes the polymer conversion to be too slow.

Temperatures for the RAFT polymerization on acrylated and acylated or acetalized polyols can range from room temperature to up to 180° C. Typical reaction temperatures for a RAFT reaction of acrylated and acylated or acetalized polyol is 120° C. or lower, for instance, from 50 to 120° C., or from 50° C. to 85° C.

The monomeric acrylated and acylated or acetalized polyol to CTA ratio can vary depending upon the desired molecular weight. In polymerization of acrylated and acylated or acetalized polyols, the multifunctional character of the monomer tends towards crosslinking. This crosslinking can be mitigated by the use of excess CTA. In one embodiment, RAFT polymerization is carried out at a molar ratio of the chain transfer agent to the monomer ranging from 1:1 to 1:10000.

Solvent is selected based the requirements of acrylated and acylated or acetalized polyol solubility and a normal boiling point compatible with the polymerization temperature. The solvent used in the RAFT polymerization of acrylated and acylated or acetalized polyol may be toluene, dioxane, THF, chloroform, cyclohexane, dimethyl sulfoxide, dimethyl formamide, acetone, acetonitrile, n-butanol, n-pentanol, chlorobenzene, dichloromethane, diethylether, tert-butanol, 1,2,-dichloroethylene, diisopropylether, ethanol, ethylacetate, ethylmethylketone, heptane, hexane, isopropylalcohol, isoamylalcohol, methanol, pentane, n-propylalcohol, pentachloroethane, 1,1,2,2,-tetrachloroethane, 1,1,1,-trichloroethane, tetrachloroethylene, tetrachloromethane, trichloroethylene, water, xylene, benzene, nitromethane, glycerol, or a mixture thereof. Typical solvent used for RAFT of acrylated and acylated or acetalized polyols is methanol, glycerol, or a mixture thereof.

The concentrations of the monomeric acrylated and acylated or acetalized polyol used in the reactions depend partially on the solubility of the monomer and the polymer products as well as the evaporation temperature of the solvent. Solvent concentration can affect the gelation of the polymer. Insufficient solvent in the RAFT reaction can cause the polymer to crosslink in a shorter time period without ever reaching high enough conversions. Therefore, solvent is typically added in excess to allow the polymer chains to grow and obtain a conversion rate to 80% without risk of the polymer reaching the gel point. The concentration of the monomeric acrylated and acylated or acetalized polyol dissolved in the solvent in the RAFT reactions may range from 5% to 100% weight percentage monomer. Typically, a monomer concentration of less than 90 wt % is suitable to ensure the solubility of the resulting polymers and additionally to prevent premature gelation.

In one embodiment, the method is carried out in the presence of a solvent, with the acrylated and acylated or acetalized polyol monomer having a concentration, when dissolved in the solvent, ranging from 1 wt % to 90 wt %, for instance, from 1 wt % to 40 wt %, from 1 wt % to 10 wt %, or from 20 wt % to 30 wt %.

In one embodiment, RAFT polymerization of the acrylated and acylated or acetalized polyol is carried out with a free radical initiator selected from the group consisting of benzoyl peroxide and azobisisobutyronitrile.

In one embodiment, RAFT polymerization of the acrylated and acylated or acetalized polyol is carried out in the presence of a chain transfer agent. The chain transfer agent used can be a thiocarbonylthio compound, a dithioester compound, a trithiocarbonate compound, a dithiocarbamate compound, or a xanthate compound capable of reversible association with polymerizable free radicals. Typically, the chain transfer agent is 1-phenylethyl benzodithioate, 1-phenylethyl 2-phenylpropanedithioate, or dibenzyl carbonotrithioate.

The above-described controlled radical polymerization can be used to polymerize acrylated and acylated or acetalized polyol, under the above-described reaction conditions effective to produce the homopolymer, copolymer, block copolymer, and statistical copolymer with a molecular weight ranging 1 KDa to 10 MKDa without gelation, for instance, a molecular weight of 50 KDa to 200 KDa without gelation, or a molecular weight of 50 KDa to 10 MKDa without gelation.

Another aspect of the present invention relates to a method of preparing a statistical copolymer. The method comprises providing monomer A, which is an acrylated and acylated or acetalized polyol monomeric unit. The acrylated and acylated or acetalized polyol monomeric unit has an average degree of acrylation which is 1 or more, but less than the number of the hydroxyl groups of the polyol and have an average degree of acylation or acetalization which is 1 or more, but less than the number of the hydroxyl groups of the polyol. The method also comprises providing a radically polymerizable monomer, represented by monomer B. The method further comprises polymerizing monomer A and monomer B simultaneously, via reversible addition-fragmentation chain-transfer polymerization (RAFT), in the presence of a free radical initiator and a chain transfer agent to form the statistical copolymer.

In some embodiments, the acrylated and acylated or acetalized polyol monomeric units have the same degree of acrylation and acylation or acetalization of hydroxyl groups.

In some embodiments, the acrylated and acylated or acetalized polyol monomeric units have different degrees of acrylation and acylation or acetalization of hydroxyl groups.

The method can be used to simultaneously polymerize three or more different monomer units. For instance, another radically polymerizable monomer, represented by C can also be provided, in addition to monomer A and monomer B. Monomer C is different than monomer A or monomer B. Monomer A, monomer B, and monomer C are then polymerized simultaneously, via RAFT, in the presence of the free radical initiator and the chain transfer agent to form the statistical copolymer. The polymerizing step may be carried out under conditions effective to achieve a number average degree of polymerization ($N_n$) for the statistical copolymer of up to 100,000 without gelation.

Suitable RAFT polymerization conditions, reaction reagents, and monomers A, B, and C for the method of preparing the statistical copolymer are the same as those discussed in the above embodiments.

In one embodiment, the statistical copolymer is a thermoplastic statistical copolymer.

In another embodiment, the statistical copolymer is a thermosetting statistical copolymer.

In one embodiment, the method comprises providing monomer A, which is an acrylated and acylated polyol monomeric unit. The acrylated and acylated polyol monomeric unit has an average degree of acrylation which is 1 or more, but less than the number of the hydroxyl groups of the polyol and have an average degree of acylation which is 1 or more, but less than the number of the hydroxyl groups of the polyol. The method also comprises providing a radically polymerizable monomer, represented by monomer B. The method further comprises polymerizing monomer A and monomer B simultaneously, via reversible addition-fragmentation chain-transfer polymerization (RAFT), in the presence of a free radical initiator and a chain transfer agent to form the statistical copolymer.

In another embodiment, the method comprises providing monomer A, which is an acrylated and acetalized polyol monomeric unit. The acrylated and acetalized polyol monomeric unit has an average degree of acrylation which is 1 or more, but less than the number of the hydroxyl groups of the polyol and have an average degree of acetalization which is 1 or more, but less than the number of the hydroxyl groups of the polyol. The method also comprises providing a radically polymerizable monomer, represented by monomer B. The method further comprises polymerizing monomer A and monomer B simultaneously, via reversible addition-fragmentation chain-transfer polymerization (RAFT), in the presence of a free radical initiator and a chain transfer agent to form the statistical copolymer.

The homopolymer, copolymer, block copolymer, or statistical copolymer can be further reacted with an organic acid to esterify one or more remaining un-acrylated, un-acylated or un-acetalized hydroxy groups in one or more acrylated acylated or acetalized polyol monomeric units, to change the solvent compatibility of the homopolymer, copolymer, block copolymer, or statistical copolymer. Alternatively, the acrylated acylated or acetalized polyol monomer, prior to polymerization, can be treated with the organic acid to esterify one or more remaining un-acrylated, un-acylated, or un-acetalized hydroxy groups the acrylated and acylated or acetalized polyol monomer. Suitable organic acids include any organic acid capable of converting the free hydroxy groups in the acrylated and acylated or acetalized polyol into alkoxy groups, such as methoxy or ethoxy. Typically used organic acids are formic acid, acetic acid, hexanoic acid, ethanoic acid, propanoic acid, amongst others.

The homopolymer, copolymer, block copolymer, or statistical copolymer, when containing unreacted acrylated groups, can undergo a crosslinking reaction at an elevated temperature. Moreover, the homopolymer, copolymer, block copolymer, or statistical copolymer can be further chemically modified with a crosslinking agent to undergo a crosslinking reaction at an elevated temperature.

The crosslinking agent used to chemically modify the homopolymer, copolymer, block copolymer, or statistical copolymer can include those that are typically used both in the synthesis of microgels and polymer networks, e.g., degradable crosslinks such as an acetal linkage, or disulfide linkages, resulting in the formation of degradable crosslinks. Exemplary crosslinking agents used to modify the homopolymer, copolymer, block copolymer, and statistical copolymer include diethyleneglycol dimethacrylate (DEGDMA), diethylene glycol diacrylate, triethylene glycol dimethacrylate (TEGDMA), ethyleneglycol dimethacrylate (EGDMA), hexane-1,6-diol diacrylate (HDDA), methylene-bis-acrylamide (MBAm), divinylbenzene (DVB), p-divinylbenzene (p-DVB), sulfur, 1,4-cyclohexanedimethanol divinyl ether, N,N'-(1,2-dihydroxyethylene)bisacrylamide, ethylene glycol diacrylate, ethylene glycol dimethacrylate, 4,4'-methylenebis(cyclohexyl isocyanate), 1,4-phenylenediacryloyl chloride, poly(ethylene glycol) diacrylate, poly(ethylene glycol) dimethacrylate, tetra(ethylene glycol) diacrylate, tetraethylene glycol dimethyl ether, triethylene glycol dimethacrylate, potassium metaborate, triethanolaminezirconate, sodium tetraborate, boric acid, zirconium complexes, borate salts, methanol, etc.

The homopolymer, copolymer, block copolymer, or statistical copolymer can be further chemically modified with a reagent to confer an acidic or basic functionality to the homopolymer, copolymer, block copolymer, or statistical copolymer, making the homopolymer, copolymer, block copolymer, or statistical copolymer a pH adjusting agent. Unreactive hydroxyl groups in the polyols can be modified with a diacid such as oxalic acid, malonic acid, succinic acid, glutatic acid, adipic acid, pimelic acid, suberic acid, azelaic acid, sebacic acid, undecanoic acid, dodecanoic acid; or a dicarboxylic acid such as ortho-phtalic acid, isophtalic acid, terephthalic acid, to provide an acidic environment. Unreactive hydroxyl groups in the polyols can also be modified with a dibasic salt such as glyphosphate, hydroquinone, resorcinol, to provide a basic environment.

The homopolymer, copolymer, block copolymer, or statistical copolymer can be further chemically modified with a reagent to confer a biocidic functionality to the homopolymer, copolymer, block copolymer, or statistical copolymer, making the homopolymer, copolymer, block copolymer, or statistical copolymer a biocide agent. The reagent can be a quaternary ammonium, glutaraldehyde, tetrakis hydroxymethyl phosphonium sulfate, etc.

Exemplary applications of the poly(acrylated and acylated or acetalized polyol)-based thermoplastic homopolymers, copolymers, block copolymers, and statistical copolymers include their use as "green" and economical alternatives to petrochemically derived thermoplastic polymers. For example, the thermoplastic homopolymers, copolymers, block copolymers, or statistical copolymers can be used as rubbers or elastomers; as components in consumer electronics, such as component for shock/impact protection or cover components; as asphalt modifiers; as resin modifiers; as engineering resins; as leather and cement modifiers; in footwear, such as in rubber shoe heels, rubber shoe soles; in automobiles, such as in tires, hoses, power belts, conveyor belts, printing rolls, rubber wringers, automobile floor mats, mud flaps for trucks, ball mill liners, and weather strips; as sealants or adhesives (such as pressure sensitive adhesives, hot-melt adhesives, or water soluble adhesives); in aerospace equipment; as viscosity modifiers for consumer care products, such as viscosity index improvers; as detergents; as diagnostic agents and supports therefore; as dispersants; as emulsifiers; as lubricants and/or surfactants; as paper additives and coating agents; as additives for the fracking industry, as fracking fluid; and in packaging, such as food and beverage packaging materials.

In some embodiments, the poly(acrylated and acylated or acetalized polyol)-based thermoplastic homopolymers, copolymers, block copolymers, and statistical copolymers can be used as a main component in a thermoplastic elastomer composition, to improve the thermoplastic and elastic properties of the composition. To form an elastomeric composition, the poly(acrylated and acylated or acetalized polyol)-based thermoplastic homopolymers, copolymers, block copolymers, or statistical copolymers can be further vulcanized, cross-linked, compatibilized, and/or compounded with one or more other materials, such as other elastomer, additive, modifier and/or filler. The resulting elastomer can be used as a rubber composition, in various industries such as in footwear, automobiles, packaging, or as an additive in the fracking industry, etc.

In one embodiment, the poly(acrylated and acylated or acetalized polyol)-based thermoplastic homopolymers, copolymers, block copolymers, or statistical copolymers can be used in an automobile, such as in vehicle tires, hoses, power belts, conveyor belts, printing rolls, rubber wringers, automobile floor mats, mud flaps for trucks, ball mill liners, and weather strips. The automobile composition (e.g., vehicle tires) may further comprise a rubber compound. The thermoplastic homopolymers, copolymers, block copolymers, or statistical copolymers can serve as a main component in a thermoplastic composition, to improve the thermoplastic and elastic properties of the automobile compositions. The resulting compositions can be further vulcanized, cross-linked, compatibilized, and/or compounded with one or more other materials, such as other elastomer, additive, modifier and/or filler.

In one embodiment, the poly(acrylated and acylated or acetalized polyol)-based thermoplastic homopolymers, copolymers, block copolymers, or statistical copolymers can be used in an asphalt binder composition, as an asphalt additive, modifier and/or filler. The asphalt binder composition may further comprise a crumb rubber.

Asphalt is defined by the ASTM as a dark brown to black cement-like material in which the predominant constituents are bitumens that occur in nature or are obtained in petroleum processing. Asphalts characteristically contain saturates, aromatics, resins and asphaltenes. The terms "asphalt" and "bitumen" are often used interchangeably to mean both natural and manufactured forms of the material, which are all within the scope of the compositions and methods contemplated and described herein. Hereinafter, only the term "asphalt" will be used to describe suitable asphalt and bitumen materials.

The type of asphalt suitable for use in the compositions and methods contemplated and described herein are not particularly limited and include any naturally occurring, synthetically manufactured and modified asphalts known now or in the future. Naturally occurring asphalt is inclusive of native rock asphalt, lake asphalt, and the like. Synthetically manufactured asphalt is often a byproduct of petroleum refining operations and includes air-blown asphalt, blended asphalt, cracked or residual asphalt, petroleum asphalt, propane asphalt, straight-run asphalt, thermal asphalt, and the like. Modified asphalt includes base asphalt (e.g., neat or unmodified asphalt that can be naturally occurring or synthetically manufactured) modified with elastomers, phosphoric acid, polyphosphoric acid, plastomers, ground tire rubber (GTR), reclaimed asphalt pavement (RAP), reclaimed asphalt single (RAS), and the like, or various combinations of these modifiers.

Furthermore, industry-grade asphalts, including without limitation, paving-grade asphalts, are advantageous for use in the compositions and methods contemplated and described herein. Non-exclusive examples of paving-grade asphalts include asphalts having any one of the following performance grade ratings: PG 46-34, PG 52-34, PG 52-28, PG 58-28, PG 64-22, PG 64-16, PG 64-10, PG 67-22, PG 70-28, PG 70-22, PG 70-16, PG 70-10, PG 76-28, PG 76-22, PG 76-16 and PG 76-10. Additionally, non-exclusive examples of paving-grade asphalts within the scope of the present invention include paving-grade asphalts having any one of the following penetration grades: 50/70, 60/90, 80/100, 80/120, and 120/150.

Additionally, it is contemplated that industry-grade asphalts, such as roof-grade asphalts, may be advantageously used in the asphalt binder compositions contemplated and described herein. In such embodiments, the asphalt binder compositions will be useful for roofing applications. Suitable roofing-grade asphalts include, for example, but not limited to, asphalts having any one of the following hardness grades: 100/150 dmm pen, 150/200 dmm pen, 200/300 dmm pen, and 300+dmm pen, such as, but not limited to PG 58-28, 64-22, 67-22, 70-22, and 76-22. In some embodiments of the asphalt binder composition, the asphalt is present at a concentration of from about 65 to about 99 weight % (wt %), based on the total weight of the asphalt binder composition. For example, the asphalt may be present at a concentration of from about 70 to 90 wt %, or from about 65 to about 75 wt %, or from about 75 to about 99 wt %, or from about 75 to about 95 wt %, or from about 75 to about 85 wt %, or even from about 85 to about 99 wt %, based on the total weight of the asphalt binder composition. In some exemplary embodiments, the asphalt is present at a concentration of from about 94 to about 99 wt %, such as about 96.5 wt %, based on the total weight of the asphalt binder composition.

Additionally, the asphalt binder composition may further comprise additives. Such additives are typically used to improve certain properties of the asphalt binder composition and products to be made therefrom (e.g., penetration (i.e., hardness), viscosity, and softening point). Non-exclusive examples of such additives suitable for inclusion in the asphalt binder compositions contemplated and described herein include, without limitation, plastomers, elastomers, waxes, polyphosphoric acids, flux oils, plasticizers, antioxidants, and combinations thereof, among others, such as, for example, recycled ground tire rubber, crumb rubber or polyoctenamer, and anti-strip additives, non-limiting examples of which are hydrated lime and amines.

In some embodiments of the asphalt binder composition, the one or more additional additives together are present at a total concentration of from about 0.5 to about 20 wt %, based on the total weight of the asphalt binder composition. For example, the total concentration of such additional additives in the asphalt binder composition may be from about 0.5 to about 1.0 wt %, or from about 1.0 to about 5.0 wt %, or from about 5.0 to about 10 wt %, or even from about 10 to about 20 w %, based on the total weight of the asphalt binder composition. More particularly, in some embodiments the asphalt binder composition may comprise a total concentration of such additional additives of from about 1 to about 2 wt %, such as about 1 wt %, based on the total weight of the asphalt binder composition.

Suitable elastomers may, for example, be selected from the group consisting of natural rubber and synthetic polymerized rubber. Other non-exclusive examples of suitable elastomers or plastomers include butyl, polybutadiene, polyisoprene and polyisobutene rubber; styrene/butadiene copolymer such as styrene/butadiene/styrene triblock copolymer (SBS); styrene/ethylene-butylene/styrene triblock copolymer (SEBS); poly(styrene-isoprene-styrene) (SIS); ethylene-methacrylate (EMA); ethylene-propylene diene monomer (EPDM); ethylene-vinyl-acetate (EVA); and ethylene-butyl acrylate-glycidyl methacrylate terpolymer.

Waxes suitable for use as an additional additive in the asphalt binder composition may be functionalized or synthetic waxes or naturally occurring waxes. Furthermore, the wax may be oxidized or non-oxidized. Non-exclusive examples of synthetic waxes include ethylene bis-stearamide wax (EBS), Fischer-Tropsch wax (FT), oxidized Fischer-Tropsch wax (FTO), polyolefin waxes such as polyethylene wax (PE), oxidized polyethylene wax (OxPE), polypropylene wax, polypropylene/polyethylene wax, alcohol wax, silicone wax, petroleum waxes such as microcrystalline wax or paraffin, and other synthetic waxes. Non-exclusive examples of functionalized waxes include amine waxes, amide waxes, ester waxes, carboxylic acid waxes, and microcrystalline waxes. Naturally occurring wax may be derived from a plant, from an animal, or from a mineral, or from other sources known now or in the future. Non-exclusive examples of natural waxes include plant waxes such as candelilla wax, carnauba wax, rice wax, Japan wax and jojoba oil; animal waxes such as beeswax, lanolin and whale wax; and mineral waxes such as montan wax, ozokerite and ceresin. Mixtures of the aforesaid waxes are also suitable, such as, for example, the wax may include a blend of a Fischer-Tropsch (FT) wax and a polyethylene wax.

Phosphoric acid is another substance that may be used as an additional additive in some embodiments of the asphalt binder composition, in conventional amounts, for example, to raise the product's softening point. The phosphoric acid may be provided in any suitable form, including a mixture of different forms of phosphoric acid. For example, some suitable different forms of phosphoric acid include phosphoric acid, polyphosphoric acid, superphosphoric acid, pyrophosphoric acid and triphosphoric acid.

Plasticizers may also be used as additional additives, in conventional amounts, to increase the plasticity or fluidity of an asphalt binder composition in accordance with embodiments described herein. Non-exclusive examples of suitable plasticizers include hydrocarbon oils (e.g., paraffin, aromatic and naphthenic oils), long chain alkyl diesters (e.g., phthalic acid esters, such as dioctyl phthalate, and adipic acid esters, such as dioctyl adipate), sebacic acid esters, glycol, fatty acid, phosphoric and stearic esters, epoxy plasticizers (e.g., epoxidized soybean oil), polyether and polyester plasticizers, alkyl monoesters (e.g., butyl oleate), and long chain partial ether esters (e.g., butyl cellosolve oleate).

Anti-oxidants may be used in conventional amounts as additional additives for the asphalt binder compositions to prevent the oxidative degradation of polymers that causes a loss of strength and flexibility in these materials.

In one embodiment, the poly(acrylated and acylated or acetalized polyol)-based thermoplastic homopolymers, copolymers, block copolymers, or statistical copolymers can be used in an adhesive or sealant composition. The adhesive or sealant composition may further comprise a tackifier and/or a plasticizer, and/or a solvent. Suitable solvents include, but are not limited to, water, and an organic solvent such as dimethyl sulfoxide (DMSO), dimethylformamide (DMF), benzene, dioxane, toluene, chloroform, hexane, cyclohexane, xylene, carbon tetrachloride, acetone, acetonitrile, butanol, heptane, and ethanol. Suitable tackifiers include, but are not limited to, isosorbide-based tackifiers; Piccotac™1095 and Piccotac™8095; glycerol ester tackifiers, such as Staybelite™ Ester 10-E Ester of Hydrogenated Rosin and Staybelite™ Ester 3-E Ester of Hydrogenated Resin; Floral™ AX-E Fully Hydrogenated Rosin; phenolic resins; styrenated terpenes; polyterpenes; rosin esters; terpene phenolics; and monomeric resins. Suitable plasticizers include, but are not limited to, benzoflex 2088 (DEGD); abietic acid; Eastman™ Triacetin; Eastman 168™ non-phthalate plasticizer; polyalkylene esthers, such as polyethylene glycol, polytetramethylene glycol, polypropylene glycol, and mixtures thereof; glyceryl monostearate; octyl epoxy soyate, epoxidized soybean oil, epoxy tallate, and epoxidized linseed oil; polyhydroxyalkanoate; glycols, such as thylene glycol, pentamethylene glycol, and hexamethylene glycol; anionic or cationic plasticizers, such as dioctyl sulfosuccinate, alkane sulfonate, and sulfonated fatty acid; phthalate or trimellitate plasticizers; polyethylene glycol di-(2-ethylhexoate); citrate esters; naphthenic oil and dioctyl phthalate; white oil; lauric, sebacic, or citric acids esters; nonfugitive polyoxyethylene aryl ether; copolymer of ethylene and carbon monoxide; photopolymerizable unsaturated liquid plasticizer; and sorbitol.

Another aspect of the present invention relates to a tire composition. The tire composition comprises a thermoplastic homopolymer, a thermoplastic copolymer, a thermoplastic block copolymer, or a thermoplastic statistical copolymer; and a rubber compound.

The tire composition may further include, if necessary, a reinforcing filler, and/or a silane coupling agent, and/or a crosslinking agent, and/or a vulcanization accelerator.

Suitable reinforcing fillers include carbon black and inorganic fillers, and the reinforcing filler is preferably at least one selected from the carbon black and inorganic fillers.

Suitable inorganic fillers include silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate, and combinations thereof.

Suitable crosslinking agents include a sulfur-based crosslinking agent, an organic peroxide-based crosslinking agent, an inorganic crosslinking agent, a polyamine crosslinking agent, a resin crosslinking agent, a sulfur compound-based crosslinking agent, oxime-nitrosamine-based crosslinking agent, and sulfur. Among these the sulfur-based crosslinking agent is preferred.

Suitable vulcanization accelerators include: guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

The tire composition may further include, if necessary, a reinforcing agent, a softening agent, a filler, a co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agents.

In one embodiment, the homopolymers, copolymers, block copolymers, or statistical copolymers of the present invention can be used as an additive in the fracking fluid or as a fracking fluid. The fracking fluid may further comprise water and sand. A typical recipe for a fracking fluid comprises about 90% water, about 8-9% sand, and about 1-2% other chemicals such as biocides, acids, inhibitors, stabilizers, crosslinkers, friction reducers, pH adjusting agents, iron control, surfactants, and gelling agents. The homopolymers, copolymers, block copolymers, or statistical copolymers can be used as a substitute for the gelling agents such as guar gum, can serve as a thickening agent for water, as a crosslinking agent, as a pH adjusting agent, as a breaking agent, or as a biocide. The fracking fluid composition can also comprise a thermoplastic polymer block added to confer a desired fluid property to the homopolymer, copolymer, statistical copolymer, or block copolymer of the present invention. Suitable thermoplastic polymer block that can be added to the homopolymers, copolymers, block copolymers, or statistical copolymers, discussed in the above embodiments, and can be used herein.

Another aspect of the present invention relates to an asphalt composition. The asphalt composition comprises: i) an asphalt component; ii) a crumb rubber having a weight percentage in the range of 1% to 15%; and iii) a thermoplastic homopolymer, a thermoplastic copolymer, a thermoplastic block copolymer, or a thermoplastic statistical copolymer as an asphalt additive, modifier, and/or filler having a weight percentage in the range of 0.01% to 1.05%. Any of the thermoplastic homopolymer, copolymer, block copolymer, or statistical copolymer discussed in the above embodiments can be used herein.

A typical source of crumb rubber is ground tire rubber (GTR). Two basic types of GTR are available based on the processes of preparing the GTR: cryogenic GTR is produced by shredding the tire into relatively large pieces and then subjecting the rubber to grinding under cryogenic conditions; ambient or warm-ground GTR is produced under warm or ambient grinding procedure. The shredding and pulling apart of the tire rubber at ambient temperatures produces irregular particles having a high surface area which desirably increases the number of reactive sites available for bonding or cross-linking with the acrylated polyol-based thermoplastic copolymer. There are many sources of GTR and the material can be used in the vulcanized or a devulcanized form. Devulcanized GTR produced by either an oxidative or reductive process can be used.

GTR of various particle sizes can be incorporated into an asphalt cement. Typically, any GTR having particle sizes smaller than about 10 mesh can be used. Exemplary ground tire rubbers have particle sizes capable of passing 20 mesh to 80 mesh screens, for instance, 30 mesh to 40 mesh screens.

Another suitable source of crumb rubber is ground industrial waste rubber. These materials can be produced by either ambient grinding or cryogenic grinding. Different types of crumb rubbers can be mixed to achieve desired properties.

The aggregate used to prepare the asphalt component can be one or a mixture of the various standard aggregates used in the art, including gravel, crushed rock, stone, quarry gravel, and recycled paving material.

To enhance certain performance specifications, other asphalt modifiers or additives can be incorporated in the asphalt composition. For instance, mineral oil, heating oils, vegetable oils, or light petroleum distillates can be added to an asphalt binder to maintain the PG value within an acceptable range.

In the asphalt rubber formulations containing the poly (acrylated and acylated or acetalized polyol)-based thermoplastic homopolymer, copolymer, block copolymer, or statistical copolymer, varying parameters, such as the concentration of the poly(acrylated and acylated or acetalized polyol)-based thermoplastic copolymer, block copolymer, or statistical copolymers, the average degree of acrylation, acylation or acetalization in the poly(aryclated and acylated or acetalized polyol), and the molecular weight of the poly(aryclated and acylated or acetalized polyol), can affect the performance of the resulting asphalt rubber.

For the poly(acrylated and acylated or acetalized polyol)-based thermoplastic homopolymer or copolymer, typically, the thermoplastic homopolymer, copolymer, block copolymer, or statistical copolymer can have a weight percentage in the range of 0.1 wt % to 30 wt % relative to the weight of the crumb rubber, e.g., a range of 0.1 wt % to 7 wt %, or 2.5 wt % to 6.5 wt % relative to the weight of the crumb rubber.

In one embodiment, the polyol in the poly(acrylated and acylated or acetalized polyol)-based thermoplastic homopolymer, copolymer, block copolymer, or statistical copolymer is glycerol; the average degree of acrylation ranges from 1.001 to 1.25; the average degree of acrylation or acetalization ranges from 1 to 2; the thermoplastic homopolymer, copolymer, block copolymer, or statistical copolymer has a molecular weight ranging from 50 KDa to 200 KDa; and the weight concentration of the thermoplastic copolymer, block copolymer, or statistical copolymer relative to the weight of the crumb rubber is from 4.5% to 15%. The resulting asphalt composition has one or more of the following properties: a high temperature grade higher than 78° C., a low temperature grade no higher than −29° C., a grade range higher than 107° C., a minimum mixing temperature lower than 171° C., and a minimum compaction temperature lower than 161° C.

In one embodiment, the polyol in the poly(acrylated and acylated or acetalized polyol)-based thermoplastic homopolymer, copolymer, block copolymer, or statistical copolymer is glycerol; the average degree of acrylation ranges from 1.001 to 1.25; the average degree of acrylation or acetalization ranges from 1 to 2; the thermoplastic homopolymer, copolymer, block copolymer, or statistical copolymer has a molecular weight ranging from 50 KDa to 200 KDa; and the weight concentration of the thermoplastic copolymer relative to the weight of the crumb rubber is from 6.5% to 15%. The resulting asphalt composition has one or more of the following properties: a high temperature grade higher than 82° C., a low temperature grade no higher than −28.5° C., a grade range higher than 110° C., a minimum mixing temperature lower than 179° C., and a minimum compaction temperature lower than 168° C.

The resulting asphalt composition prepared from the above embodiments can be stable and homogenous for at least 3 days under a temperature of 130° C. to 180° C.

Another aspect of the present invention relates to a method for preparing a homogeneous asphalt composition. The method comprises mixing a thermoplastic homopolymer, a thermoplastic copolymer, a thermoplastic block copolymer, or a thermoplastic statistical copolymer as an asphalt additive, modifier, and/or filler, with a weight percentage in the range of 0.01% to 1.05%, into an asphalt composition to form a homogeneous asphalt composition. The asphalt composition comprises i) an asphalt component, and ii) a crumb rubber having a weight percentage in the range of 1% to 15%. Any of the thermoplastic homopolymer, copolymer, block copolymer, or statistical copolymer discussed in the above embodiments can be used herein.

Suitable crumb rubbers, sizes of the crumb rubbers, aggregate used to prepare the asphalt component, other asphalt modifiers or additives, and detailed asphalt rubber formulations containing the poly(acrylated and acylated or acetalized polyol) varying the average degree of acrylation, acylation, and acetalization, the molecular weight and the concentration of poly(arylated and acylated or acetalized polyol) have been described in the above embodiments relating to the asphalt composition, and are also suitable for the method of preparing the homogeneous asphalt composition herein.

One way to mix the thermoplastic homopolymer, copolymer, block copolymer, or statistical copolymer into an asphalt composition is by premixing GTR and the thermoplastic homopolymer, copolymer, block copolymer, or statistical copolymer, then adding the pre-mixture to an asphalt component, typically a hot liquified asphalt cement, and continuing the mixing at the same temperature range.

Alternatively, the GTR can be mixed with an asphalt component, typically a hot liquified asphalt cement. The thermoplastic homopolymer, copolymer, block copolymer, or statistical copolymer is then added into the mixture, and the mixing is continued at the same temperature range.

The mixing temperature can depend upon the qualities and characteristics of the asphalt cement. The mixing of the acrylated and acylated or acetalized-polyol-based thermoplastic homopolymer, copolymer, block copolymer, or statistical copolymer with the asphalt rubber composition is typically carried out at a temperature range of 130° C. to 180° C.

The use of the poly(acrylated and acylated or acetalized glycerol) in an asphalt rubber lowers mixing and compaction temperatures and lowers the separation of the asphalt rubber after curing. Thus, the mixing can occur at a location remote from the location at which the homogeneous asphalt composition is used. The resulting asphalt composition is stable and homogenous for at least 3 days at a temperature of 130° C. to 180° C.

Another aspect of the present invention relates to a method for preparing a fracking liquid. The method comprises mixing the thermoplastic homopolymer, the thermoplastic copolymer, the thermoplastic block copolymer, or the thermoplastic statistical copolymer as a chemical additive, with water, and sand.

Another aspect of the present invention relates to a method for preparing an adhesive or sealant composition. The method comprises mixing the thermoplastic homopolymer, the thermoplastic copolymer, the thermoplastic block copolymer, or the thermoplastic statistical copolymer, with a tackifier, and/or a plasticizer, and/or a solvent.

Another aspect of the present invention relates to a packaging composition. The packaging composition comprises a thermosetting homopolymer, a thermosetting copolymer, a thermosetting block copolymer, or a thermosetting statistical copolymer.

In one embodiment, the packaging composition is vulcanized, cross-linked, compatibilized, and/or compounded with one or more other material.

The following examples are provided to illustrate embodiments of the present invention, but they are by no means intended to limit the scope.

EXAMPLES

Example 1—Materials

ACS grade glycerol (>99.5% purity) and ACS grade acetic anhydride (>97%) were purchased from Fisher Scientific. Amberlyst 15-Acidic catalytic resin was purchased from Dow Chemical. Methacrylic acid (99%), methacrylic anhydride (94%), and AIBN (98%) were purchased from Sigma Aldrich. All chemicals except AIBN were used as received. AIBN was recrystallized from methanol.

Example 2—Production of 1-Glycerol Methacrylate Precursor

1-Glycerol methacrylate was produced by reacting glycerol (1 mol) with methacrylic acid (1.56 moles) in the presence of Amberlyst (5 g per 100 mL of solution). The reaction was allowed to proceed for 24 hours at 100° C. The mixture was decanted off of the Amberlyst. After the reaction was complete the product was used in the next step without any purification.

Example 3—Production of 1,3 Glycerol Acetate Precursor

Glycerol (1 mol, 10% mass by final solution mass of acetic acid) and acetic anhydride (2 moles) were added in the presence of Amberlyst (5 g per 100 mL of solution). The addition of acetic anhydride was done over the course of an hour to prevent too large of an exotherm. The mixture was allowed to stir for approximately 16 hours before being purified. Acetic acid and any unused acetic anhydride were evaporated. This was done to prevent a competing reaction during the next step (methacrylation step), as this next step that was performed at an elevated temperature.

Example 4—Production of Glycerol-2-3-Acetylate-1-MethAcrylate (GRAMA Version 1 or GRAMA-v1)

Acetic anhydride (3 moles) was added to the 1-glycerol methacrylate over an hour for every mole of 1-glycerol methacrylate. Amberlyst was already present and no additional Amberlyst was required. The reaction was allowed to stir at room temperature for approximately 16 hours. The final product was purified by liquid-liquid extraction into diethyl ether and water. The ether layer was extracted three times with water to remove all acid. On the final wash, sodium bicarbonate was added to remove all traces of acid. Finally the product was dried under reduced pressure to remove the solvent.

Example 5—Production of Glycerol-1,3-Acetylate-2-MethAcrylate (GRAMA Version 2 or GRAMA-v2)

For every mole of 1,3 glycerol acetate 2 moles of methacrylic anhydride were added to the solution. As Amberlyst was present, no additional Amberlyst was necessary. All reagents were added together at room temperature and then the temperature was raised to 80° C. and then the reaction was allowed to proceed for 4 hours. Upon completion of reaction, the product was treated the same way as described in Example 4 above for the purification of GRAMA-v1.

Example 6—Production of GRAMA v-1 & GRAMA v-2 Thermosets

GRAMA and recrystallized AIBN were added together in a vial with varying weight percentages of AIBN-gently heated, and then pippeted into a rectangular bar silicone mold. The mold was filled until it was concaved up to account for shrinking as curing. This gave a fairly flat rectangular bar upon curing. The mold was an 8.75 Wx11 Lx 3.75D mold. Curing was done in a convection oven set at varying temperatures. The curing was allowed to go to completion, usually around 2-3 hours. Once curing was completed, the sample was removed from the mold.

Example 7—Characterization Techniques

Proton NMR was used for characterization of the monomers. A universal testing machine and dynamic mechanical analysis ("DMA") were used for the mechanical and thermal characterization of the thermosets.

Example 8—Results of Examples 1-7

Monomer

Figure 2:
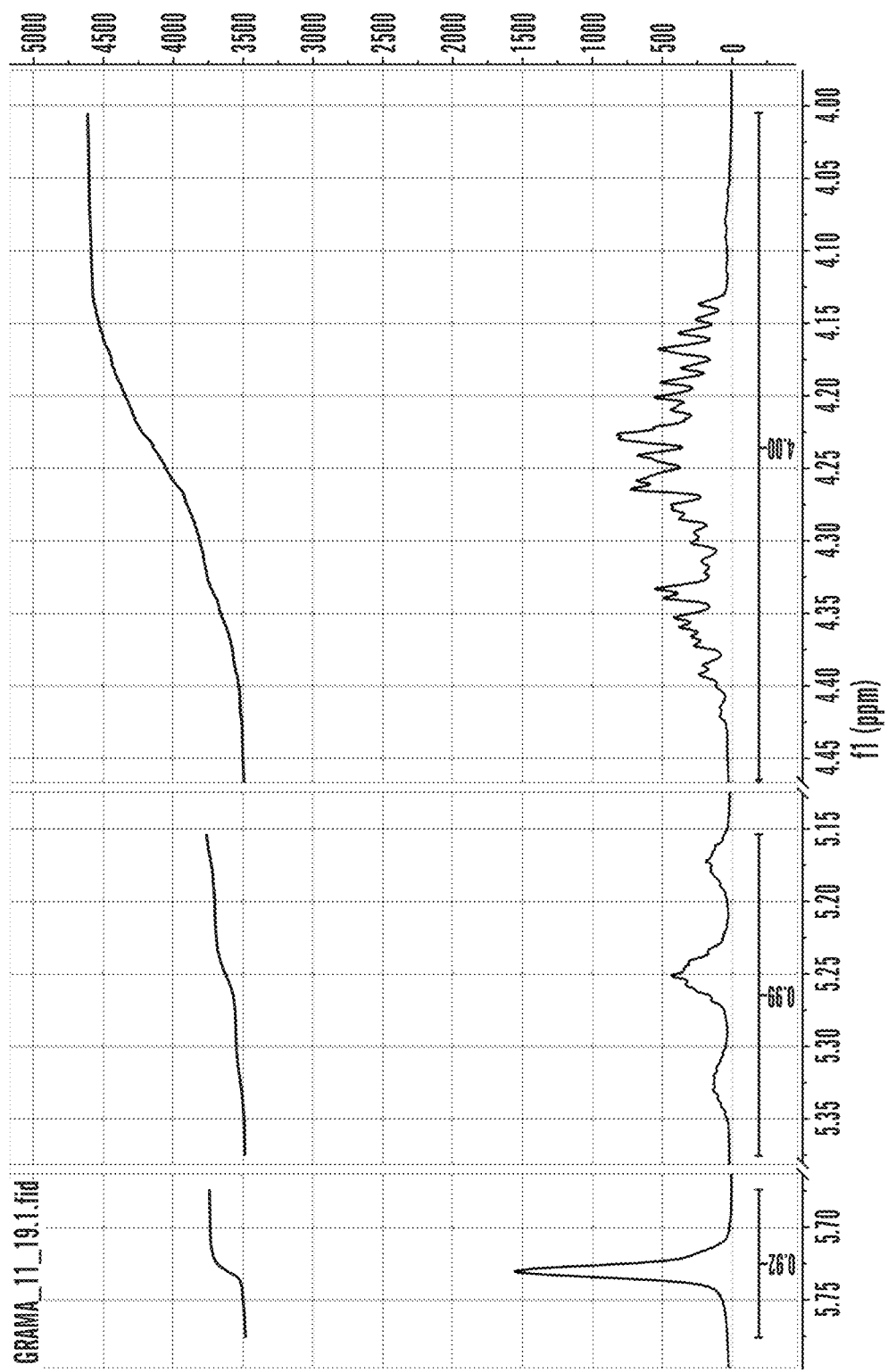
FIG. 2 shows $^1$H-NMR of the glycerol-1,3-acetylate-2-methacrylate (GRAMA) monomer.

The three integrals in FIG. 2 correspond to the backbone of the glycerol peak and the methacrylate peak. These peaks, from left to right, correspond to one of the protons on the acrylic acid, the secondary proton on the glycerol backbone, and the primary protons on the glycerol backbone. Based on the structure of the monomer, a ratio of 1:4 was expected for the middle peak to the right peak. Accordingly, these intensities were assigned to the middle peak and to the right peak. The intensity of the left peak showed the degree of functionality (acrylation of the glycerol molecule). Less than 1 functional group per molecule was observed, indicating that there was some amount of glycerol tri-acetate present in a monomer.

Polymer

Figure 3:
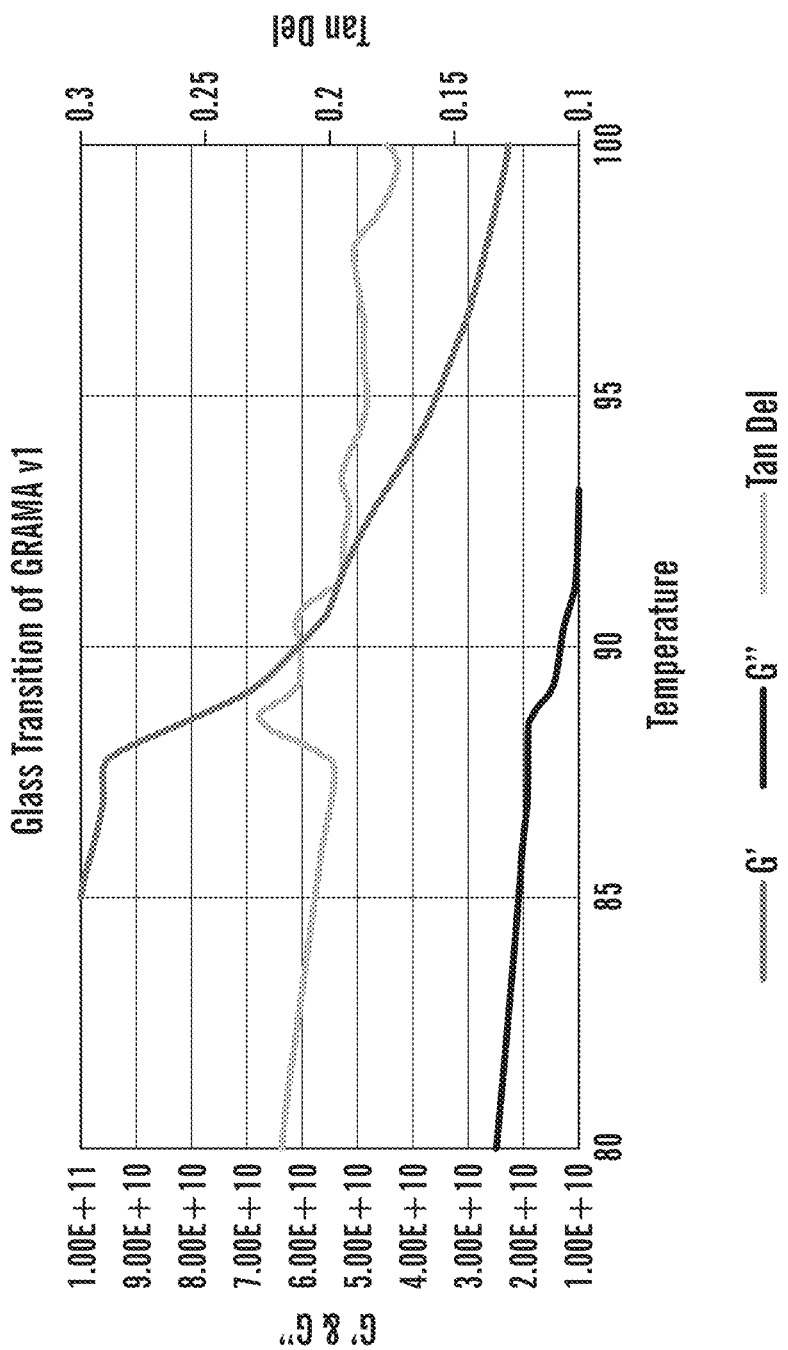
FIG. 3 is a graph showing glass transition of GRAMA v1.

The DMA plot (FIG. 3) showed that the glass transition in the polymer was around 87-90° C.

Figure 4:
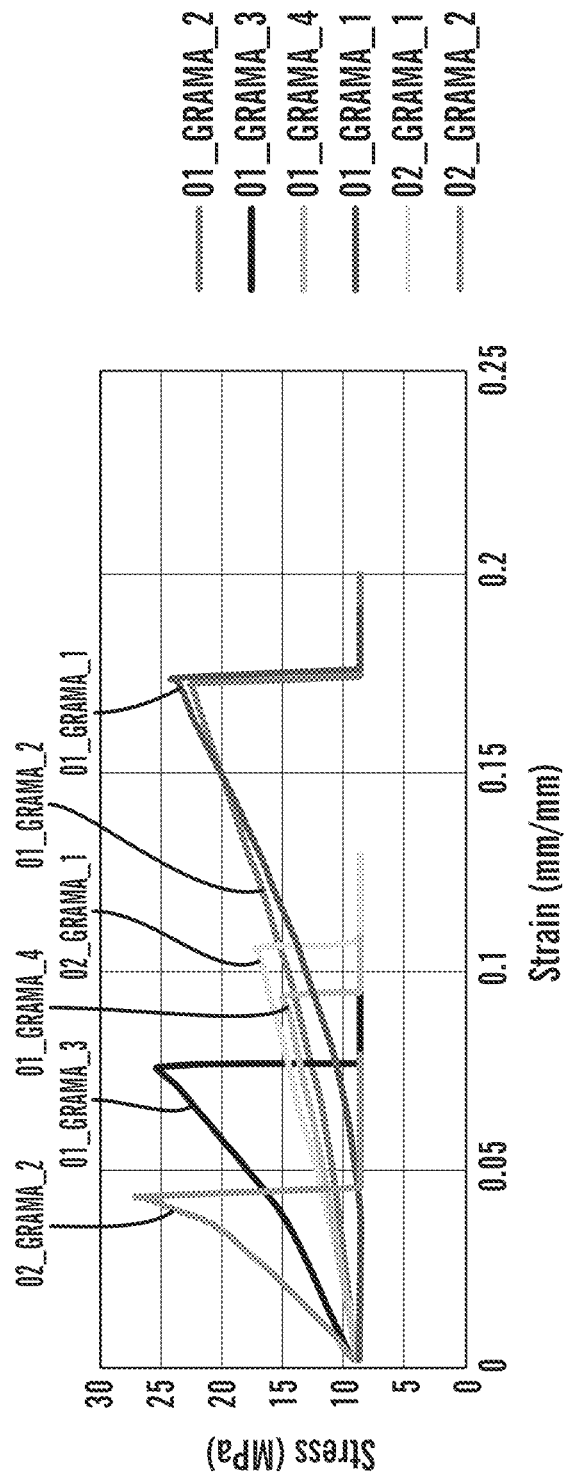
FIG. 4 is a graph showing stress vs. strain for GRAMA at two initiator concentrations.

The UTM (FIG. 4) showed that the break modulus was somewhere in the 20 MPa range.

Table 1 shows the relevant mechanical properties of GRAMA thermosets such as the break modulus, Young's Modulus, ultimate tensile strength, and break strain.

TABLE 1

|  | Break Modulus | Slope-Young's Modulus | Area under curve-Ultimate Tensile Strength | Break Strain |
| --- | --- | --- | --- | --- |
| 01 GRAMA 1 | 23.78 | 99.00 | 2.68 | 0.17 |
| 01 GRAMA 2 | 22.36 | 269.00 | 1.41 | 0.17 |
| 01 GRAMA 3 | 25.07 | 75.00 | 1.27 | 0.08 |
| 01 GRAMA 4 | 14.63 | 149.00 | 2.43 | 0.09 |
| 02_GRAMA_1 | 16.96 | 84.44 | 1.51 | 0.11 |
| 02_GRAMA_2 | 26.86 | 382.00 | 0.98 | 0.04 |

Example 9—Production of 1-Glycerol Methacrylate Sub-Functionalized Precursor

1-Glycerol methacrylate was produced by reacting glycerol (1 mol) with methacrylic acid (0.91 moles) in the presence of Amberlyst (5 g per 100 mL of solution). The reaction was allowed to proceed for 24 hours at 100° C. The mixture was decanted off of the Amberlyst. After the reaction was completed, the product was used in the next step without any purification.

Example 10—Production of Glycerol-2-3-Acetylate-1-MethAcrylate (Sub-Functionalized GRAMA Version 1 or Sub-Functionalized GRAMA-v1)

Acetic anhydride (3 moles) was added to the 1-glycerol methacrylate (Example 9) over an hour for every mole of 1-glycerol methacrylate. Amberlyst was already present and no additional Amberlyst was required. The reaction was allowed to stir at room temperature for approximately 16 hours. The final product was purified by liquid-liquid extraction into diethyl ether and water. The ether layer was extracted three times with water to remove all acid. On the final wash, sodium bicarbonate was added to remove all traces of acid. Finally the product was dried under reduced pressure to remove the solvent.

Example 11—Thermoplastics from GRAMA-v1

Figure 5:
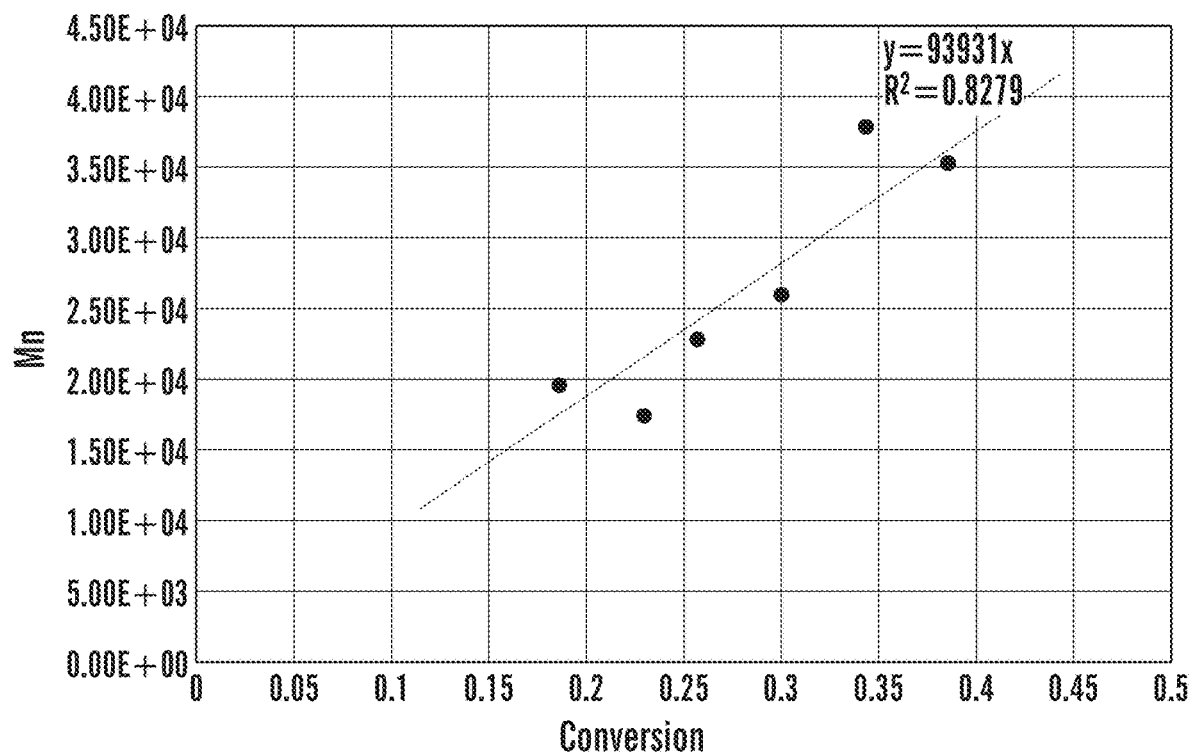
FIG. 5 is a graph showing conversion vs. molecular weight for GRAMA thermoplastic-RAFT polymerization.

GRAMA (3 g) was mixed with toluene (15 g), 2-cyano-2-propanyl ethyl carbonotrithioate (CYCART) (0.006 g), and AIBN (0.000493 g). This solution was then bubbled with argon for 15 minutes and reacted at 80° C. for 4 hours to afford a glass polymer upon precipitation in hexanes. The results of polymerization conversion versus molecular weight are shown in FIG. 5.

Example 12—Production of Solketal Methacrylate (SMA) Using Steglich Esterification Methacrylic acid (10.33 g) was dissolved in dichloromethane (200 mL). DMAP (1.2 g) and DCC (24.76 g) were added to the flask slowly. Finally, solketal (13.2 g) was added to the flask slowly and stirred at room temperature for 24 hours. Upon completion the sample was filtered, and byproducts were removed via crystallization in hexanes.

Example 13—Production of SMA Using Transesterification

Solketal (60 g) was mixed with methyl methacrylate (135 g), potassium carbonate (3.1 g), and phenothiazine (0.02 g). This mixture was then heated to reflux over 5 Å molecular sieves using a soxhlet extractor.

Example 14—Thermoplastics of SMA

Figure 6:
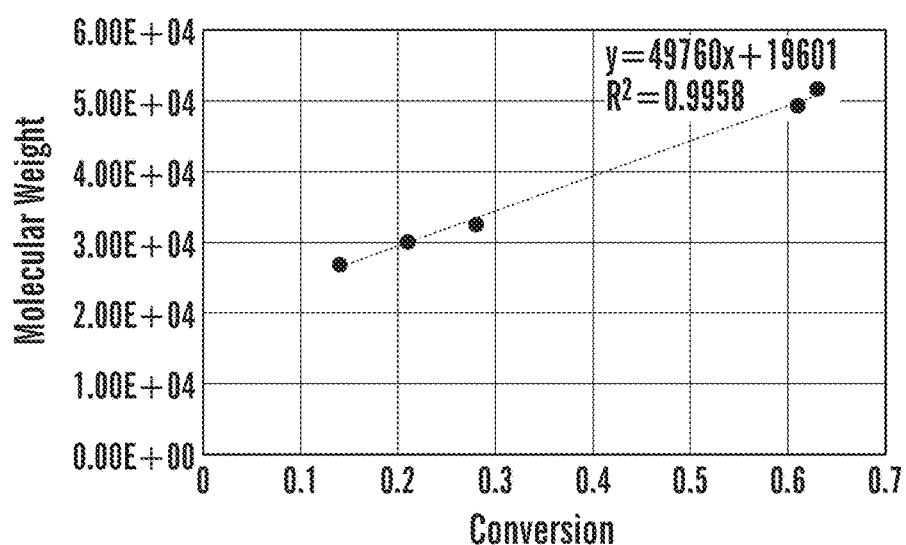
FIG. 6 is a graph showing conversion vs. molecular weight for solketal methacrylate RAFT polymerization.
Figure 7:
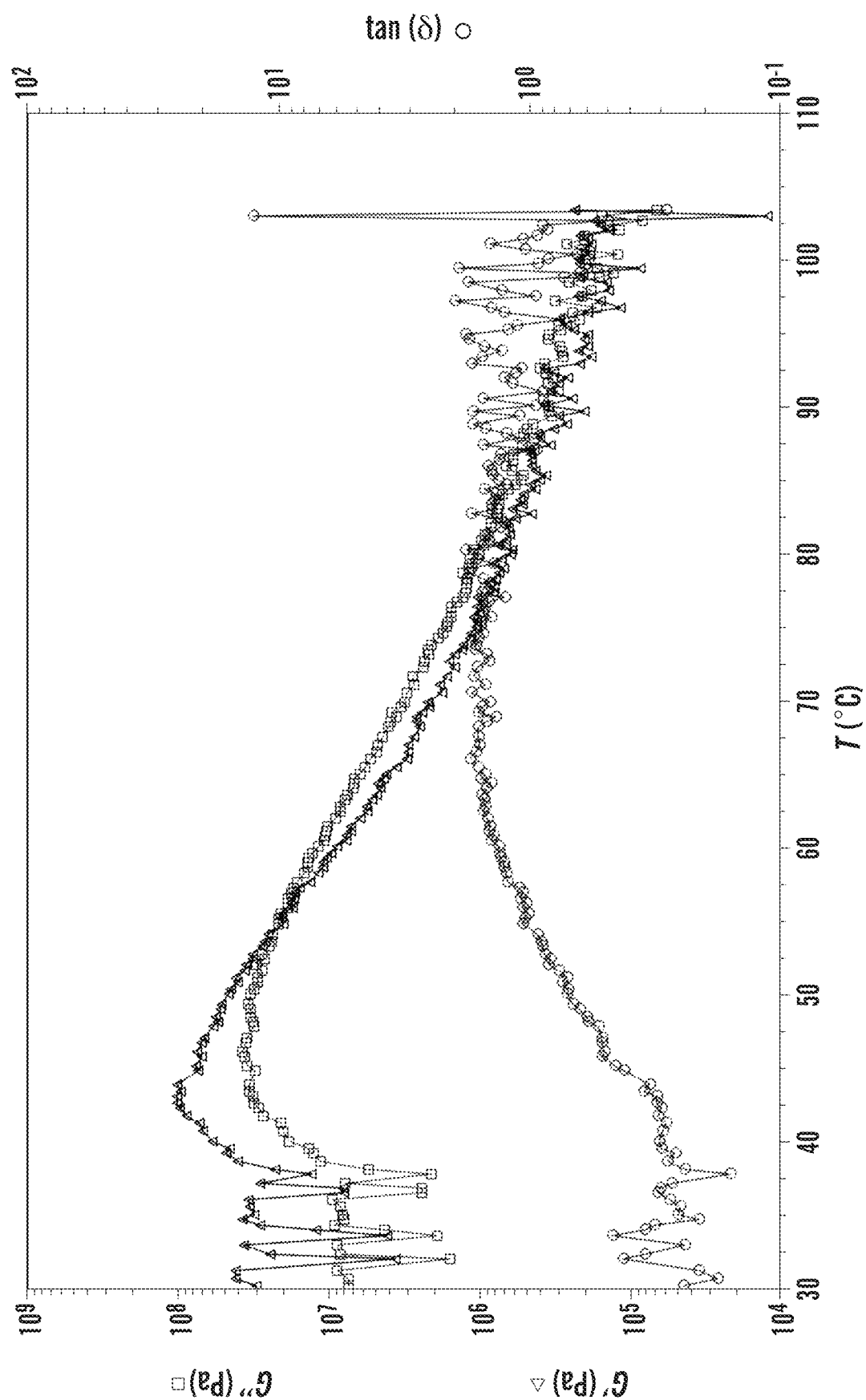
FIG. 7 is a graph showing Storage Modulus (G') and Loss Modulus (G") for the solketal methacrylate thermoplastic polymer.
Figure 8:
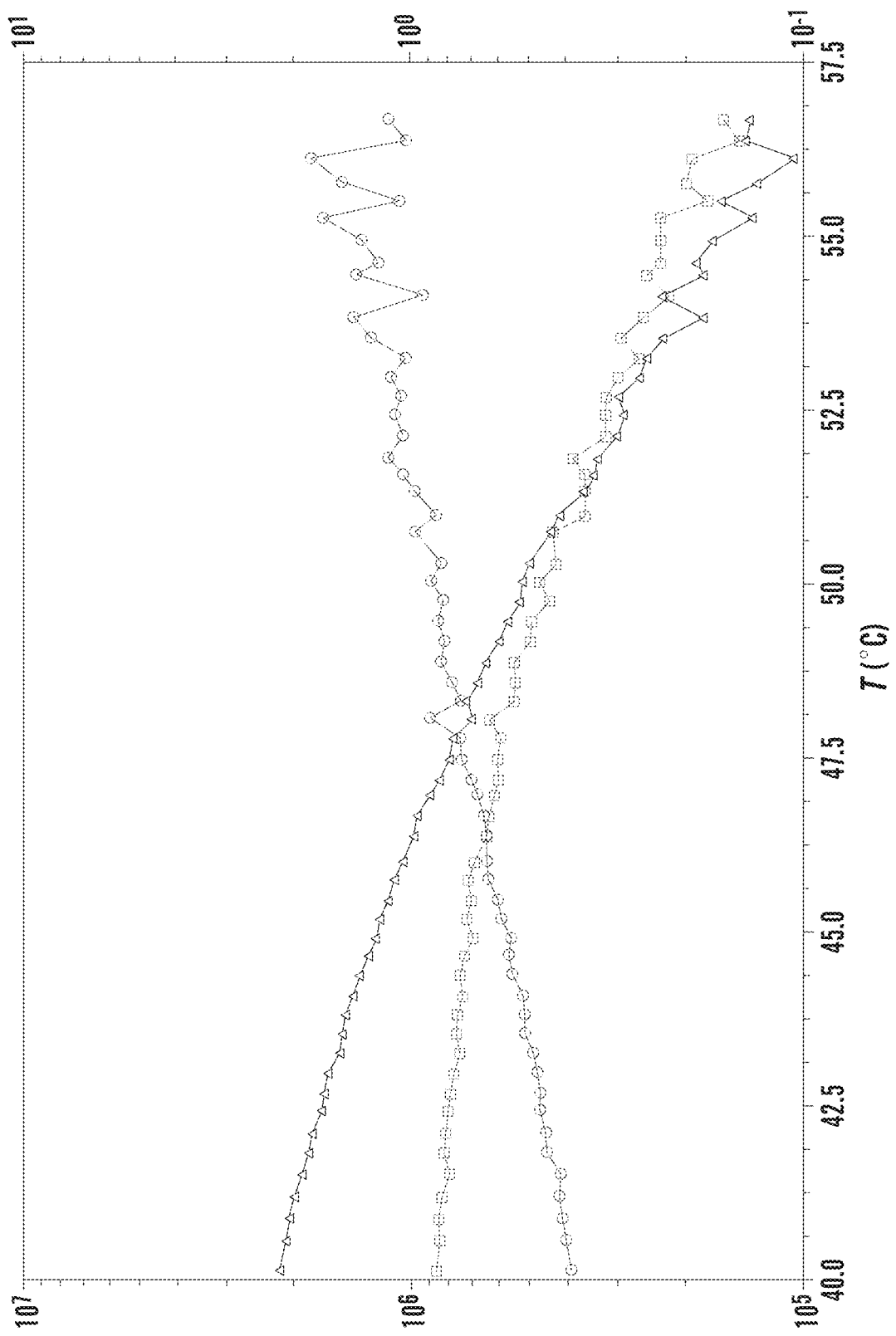
FIG. 8 is a graph showing results of the Dynamic Mechanical Analysis of the solketal methacrylate thermoplastic polymer.

SMA (1 g) was mixed with toluene (4 g), AIBN (0.00115 g), and CYCART (0.00205 g). This solution was then purged and heated at 80° C. for 4 hours. The polymer was then precipitated in hexanes to give a glassy polymer. The results of this polymerization are shown in FIG. 6. Rheology and DMA were also done and the results are shown in FIGS. 7 and 8. FIG. 7 shows a decrease in the G' and G" as temperature increases. FIG. 8 shows that the storage modulus (blue) and loss modulus (green) are decreasing as temperature increases.

Example 15—Production of Glycerol Cyclopentanone Ketal (1,4-Dioxaspiro [4,4] nona-2-yl Methanol) Pre-Monomer Glycerol (119.6 g) and cyclopentanone (84.12 g) were added with p-toluene sulfonic acid (1.8 g) and toluene as solvent. The mixture was heated to reflux and the water generated was collected in the dean stark apparatus. The reaction mixture was washed with brine (2*150 mL) and water (1*150 mL) and distilled under vacuum.

Example 16 Production of 1,4-Dioxaspiro [4,4] nona-2-yl Methyl Methacrylate (GCM)

Glycerol-cyclopentanone ketal (1,4-dioxaspiro [4,4] nona-2-yl) methanol) (154 g), excess methyl methacrylate (MMA) (300 g) and 5 Å molecular sieves (230 g) were added with enzyme Lipase Acrylic resin from Candida Antarctica (commonly known as Novozyme 435) (6 g) and heated to 40° C. and allowed to react for 24 hours. The excess MMA was removed by rotary evaporator and the monomer was purified through a Biotage flash chromatography using a Biotage KP-Sil cartridge using hexanes and ethyl acetate.

Example 17 Thermoplastics of GCM

Figure 9:
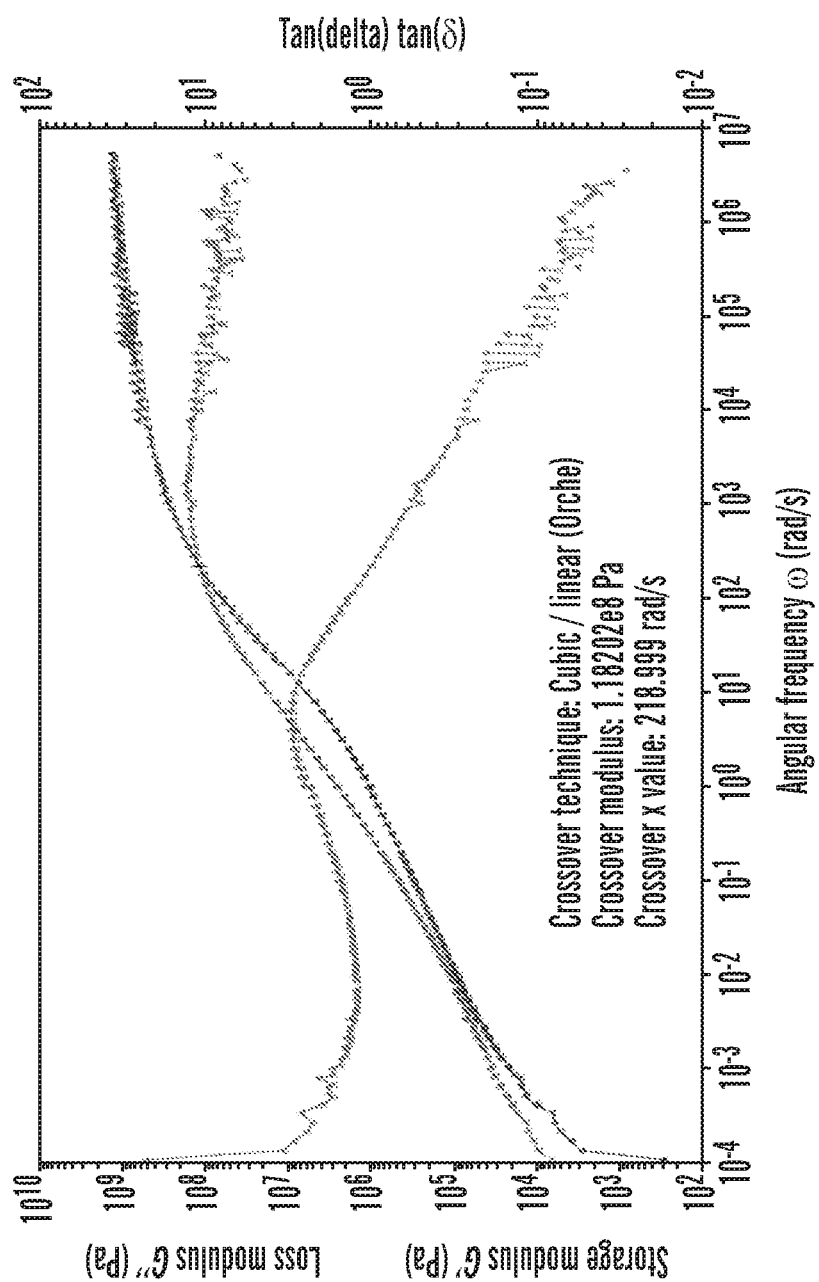
FIG. 9 is a graph showing the Storage Modulus (G') and Loss Modulus (G") for the of 1,4-dioxaspiro [4,4] nona-2-yl methyl methacrylate polymer.
Figure 10:
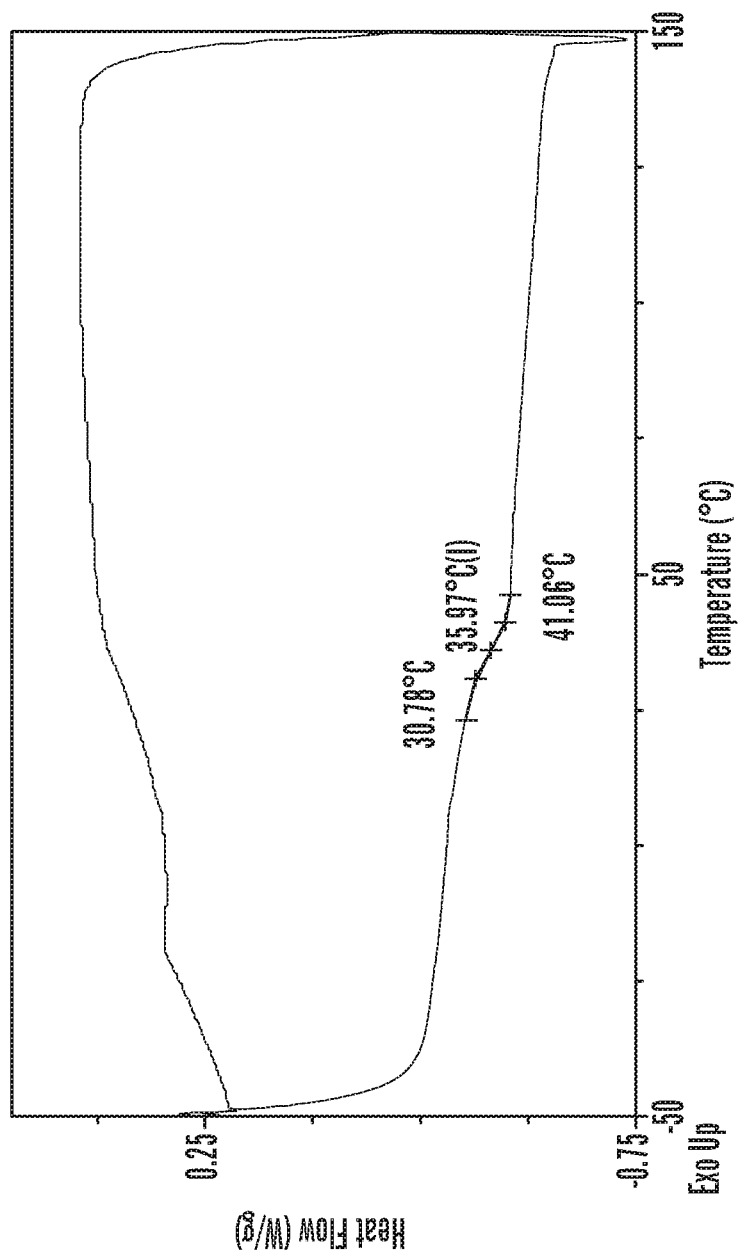
FIG. 10 is a graph of the differential scanning calorimetry data for the 1,4-dioxaspiro [4,4] nona-2-yl methyl methacrylate (GCM).

GCM (1 g) was mixed with toluene (2 g), AIBN (0.00082 g), and CYCART (0.00205 g). This solution was then purged and heated at 80° C. for 4 hours. The polymer was then precipitated in hexanes to give a glassy polymer. Rheology and DSC were also done, and the results are shown in FIGS. 9 and 10. FIG. 9 shows a decrease in the G' and G" as temperature increases. FIG. 10 shows that the glass transition temperature of the polymer synthesized.

Example 18 Production of Glycerol Butanone Ketal (2-Ethyl-2-methyl-1,3-diaxolan-4-yl Methanol) Pre-Monomer Glycerol (157.5 g) and butanone (370.43 g) were added with p-toluene sulfonic acid (2.5 g) and toluene as solvent. The mixture was heated to reflux and the water generated was collected in the dean stark apparatus. The reaction mixture was washed with brine (2*150 mL) and water (1*150 mL) and distilled under vacuum.

Example 19 Production of (2-Ethyl-2-methyl-1,3-diaxolan-4-yl) Methyl Methacrylate (GMM)

Glycerol-butanone ketal (2-ethyl-2-methyl-1,3-diaxolan-4-yl methanol) (100 g), excess methyl methacrylate (MMA) (228.3 g), and 5 Å molecular sieves (151.5 g) were added with enzyme Lipase Acrylic resin from Candida Antarctica (commonly known as Novozyme 435) (4 g) were heated to 40° C. and allowed to react for 24 hours. The excess MMA was removed by rotary evaporator and the monomer was purified through a Biotage flash chromatography using a Biotage KP-Sil cartridge using hexanes and ethyl acetate.

Example 20 Thermoplastics of GMM

Figure 11:
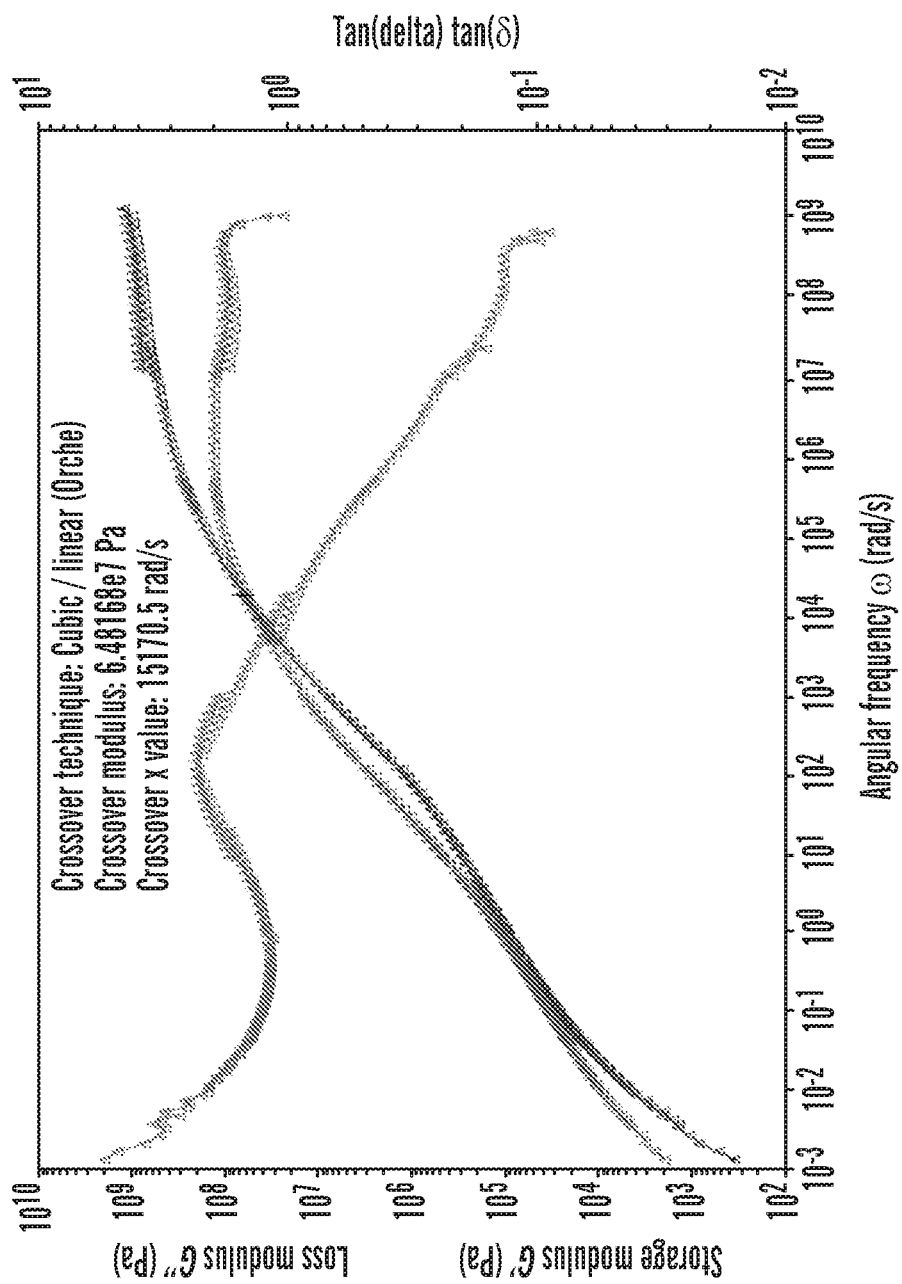
FIG. 11 is a graph showing the Storage Modulus (G') and Loss Modulus (G") for the 2-ethyl-2-methyl-1,3-diaxolan-4-yl methanol.
Figure 12:
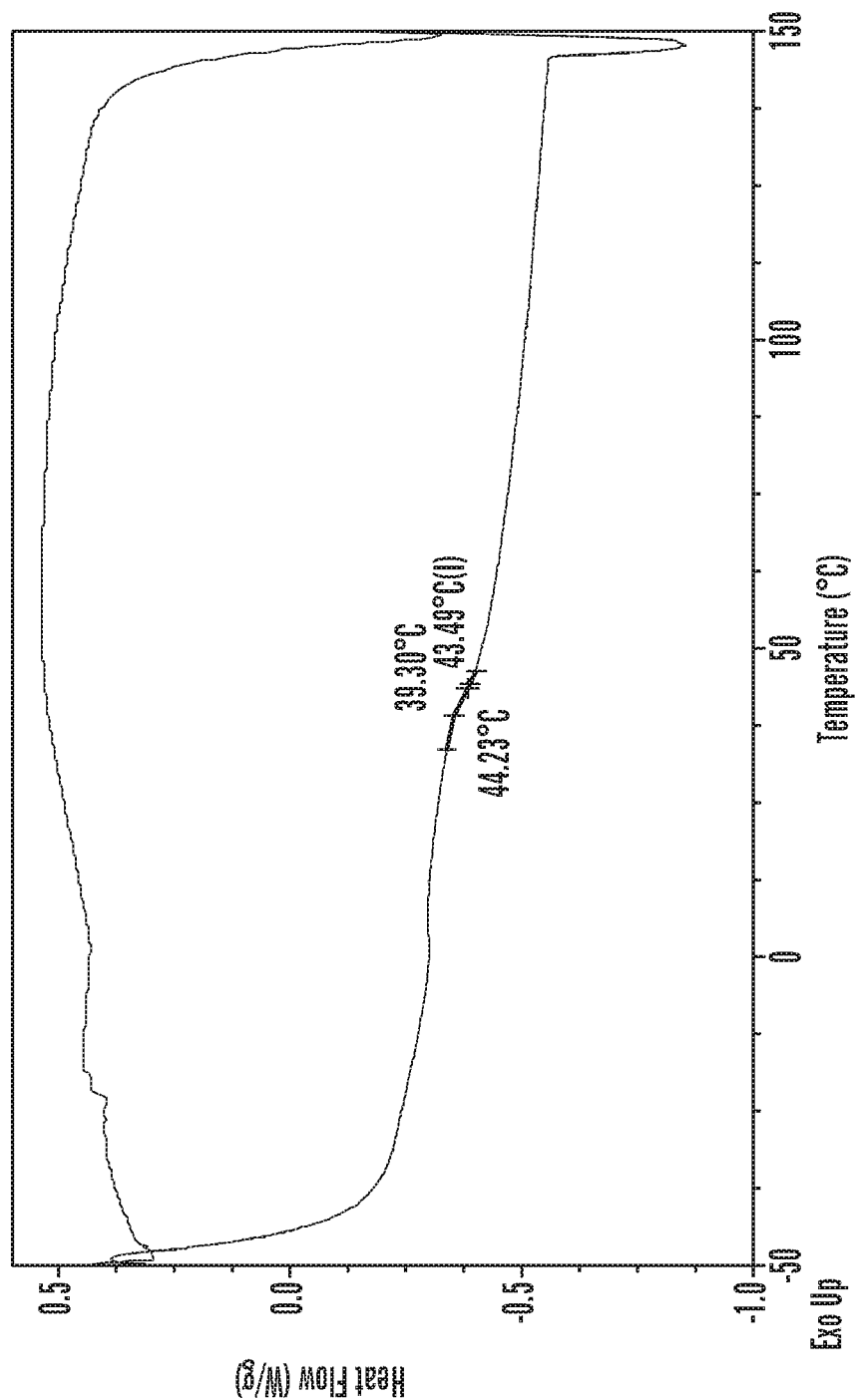
FIG. 12 is a graph showing the differential scanning calorimetry data for the 2-ethyl-2-methyl-1,3-diaxolan-4-yl methanol.

GCM (1 g) was mixed with toluene (1 g), AIBN (0.00143 g), and CYCART (0.00256 g). This solution was then purged and heated at 80° C. for 4 hours. The polymer was then precipitated in hexanes to give a glassy polymer. Rheology and DSC were also done, and the results are shown in FIGS. 11 and 12. FIG. 11 shows a decrease in the G' and G" as temperature increases. FIG. 12 shows the glass transition temperature in the DSC curve of the polymer synthesized.

Example 21—Materials for Examples 22-27

Isosorbide (98.0%) was purchased from Fisher Scientific. Ethanox 330 was purchased from SI group. Acetic acid (99.0%), Amberlyst 15 dry resin, reagent grade (99%), methacrylic acid, acrylated epoxidized soybean oil (4,000 ppm inhibitor), N,N-dimethylformamide (DMF) anhydrous (99.8%), hexane (anhydrous) (95.0%), 2-phenyl-2-propyl benzodithioate (99% HPLC grade), and 2,2'-azobis(2-methylpropionitrile) (98%) were purchased from Sigma-Aldrich. All chemicals except the AIBN were used without further purification. AIBN was recrystallized in methanol.

Example 22—Methylacrylate Isosorbide Synthesis

Isosorbide (10.0 g, 0.0684 mol), Amberlyst dry 15 resin (0.319 g, 2.8 mmol), and Ethanox 330 (0.204 g, 22.9 mmol) were added to a round bottom flask. The round bottom flask was heated up to 70° C. to melt the isosorbide. Methacrylic acid (7.0 molar excess) was added to the round bottom flask at 70° C. The reaction was then heated up to 110° C. and allowed to react for 24 hours. The solution was then filtered to remove the Amberlyst 15 dry resin. The excess reagents and solvent were removed from solution using rotary evaporation.

Example 23—Acetylate Methylacrylate Isosorbide Synthesis

Methylacrylate isosorbide (10.0 g, 0.0684 mol), Amberlyst dry 15 resin (0.319 g, 2.8 mmol), Ethanox 330 (0.204 g, 22.9 mmol), and acetic acid (3.0 molar excess) were added to a round bottom flask. The reaction was then heated up to 110° C. and allowed to react for 12 hours. The solution was then filtered to remove the Amberlyst 15 dry resin. The excess reagents and solvent were removed from solution using rotary evaporation.

Example 24—Methylacrylate Sorbitol Synthesis

Sorbitol (5.0 g, 0.0274 mol), amberlyst dry 15 resin (0.252 g, 0.93 mmol), and Ethanox 330 (0.067 g, 66.0 mmol) of were added to a round bottom flask. This round bottom flask was heated up to 70° C. to melt the isosorbide. A methacrylic acid (7.0 molar excess) was added to the round bottom flask at 70° C. The reaction was then heated up to 110° C. and allowed to react for 24 hours. The solution was then filtered to remove the Amberlyst 15 dry resin. The excess reagents and solvent were removed from solution using rotary evaporation.

Example 25—Acetylate Methylacrylate Sorbitol Synthesis

Sorbitol (5.0 g, 0.0274 mol), amberlyst dry 15 resin (0.252 g, 0.93 mmol), Ethanox 330 (0.067 g, 66.0 mmol), and acetic acid (7.0 molar excess) were added to a round bottom flask. The reaction was then heated up to 110° C. and allowed to react for 12 hours. The solution was then filtered to remove the Amberlyst 15 dry resin. The excess reagents and solvent were removed from solution using rotary evaporation.

Example 26—Polymer Synthesis

Methacrylate Isosorbide

Methacrylate isosorbide (1.6 acrylate groups) was polymerized with a target molecular weight of 50 kDa. AIBN was added at a 0.2:1 molar ratio to CTA. The monomer, DMF, AIBN, and OXCART were added together and purged with argon to remove traces of oxygen. The polymerization was reacted at 90° C. for 2 hours with a 40% conversion.

Acetylated Methacrylate Isosorbide

This polymerization used acetylated methacrylate isosorbide (1.6 acrylate and 0.4 acetylate groups) and was similar to the methacrylate isosorbide polymerization.

Methacrylate Sorbitol

Methacrylate soketal (1.2 acrylate groups) was polymerized with a target molecular weight of 30 kDa. AIBN to CTA Ratio is the same as above, and the reaction time was 2 hours at 90°.

Poly-Methacrylate Isosoribide~Poly-Acrylate Epoxidized Soybean Oil

Acrylate epoxidized soybean oil was polymerized with poly-methacrylate isosorbide (30 kDa) at a target mol composition of 15.0% poly-methacrylate isosorbide. The polymerization was done at a 0.2:1 AIBN to CTA ratio and 2.0:1 solvent ratio by volume to solids. The poly-methacrylate isosorbide, DMF, AIBN, and CTA were added in a flask and bubbled with argon. They were then reacted at 75° C. for 8 hours, resulting in a block copolymer (45% yield).

Example 27—Polymer Characterization

Molecular weight was determined using Malvern HT-350A GPC, using universal PMMA standards.

Methacrylate Isosorbide

Figure 13:
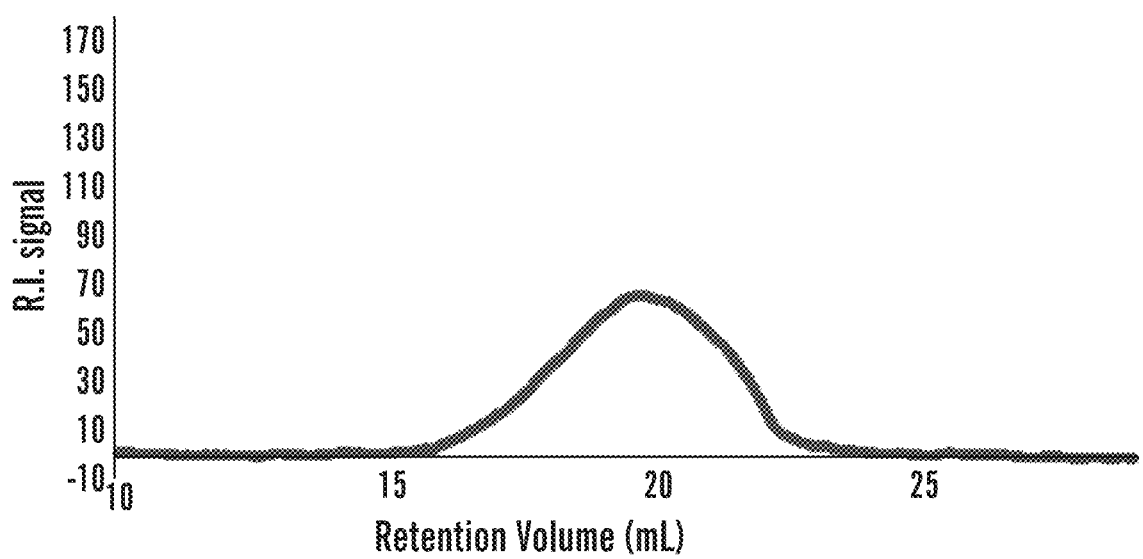
FIG. 13 is a graph the GPC trace of Methacrylate Isosorbide polymer 30 kDa.
Figure 14:
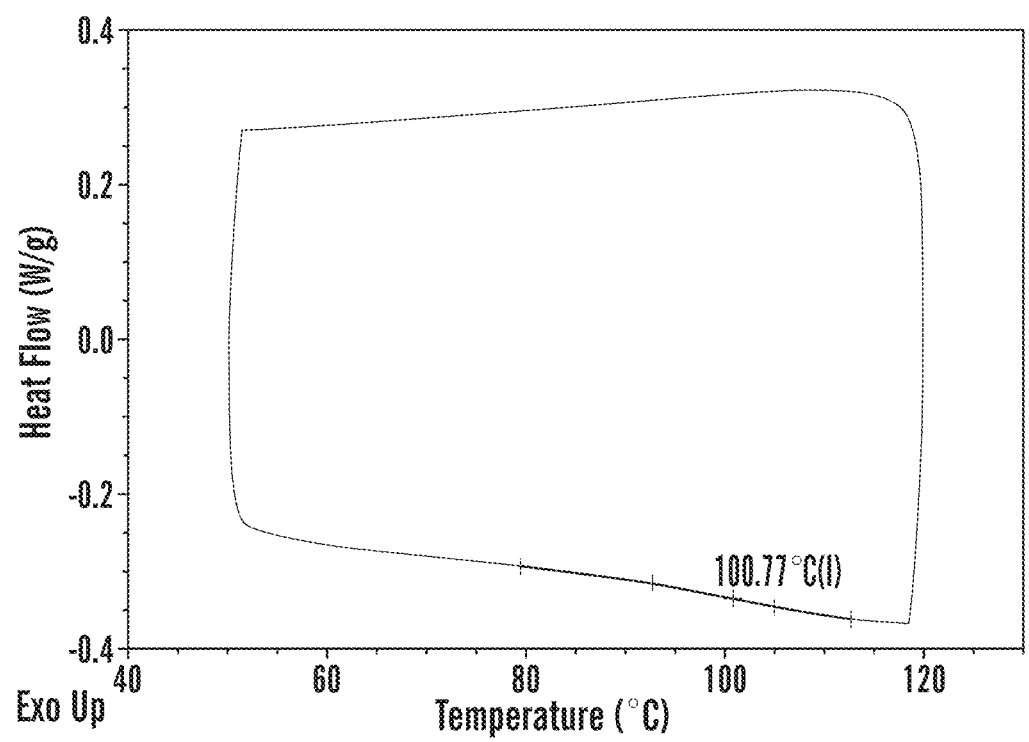
FIG. 14 is a graph showing results of the DSC of 30 kDa Poly-Methacrylate Isosorbide.

The molecular weight results of the polymerization can be seen in FIG. 13. Methacrylate Isosorbide monomer used in FIG. 13 has acrylate content of 1.6. This reaction produced a polymer with a MW of 30 kDa and PDI of 2.52. FIG. 14 shows the Dynamic Scanning calorimetry graphs with a small glass transition temperature of the polymer 100.7° C.

Methylacrylate Sorbitol

Figure 15:
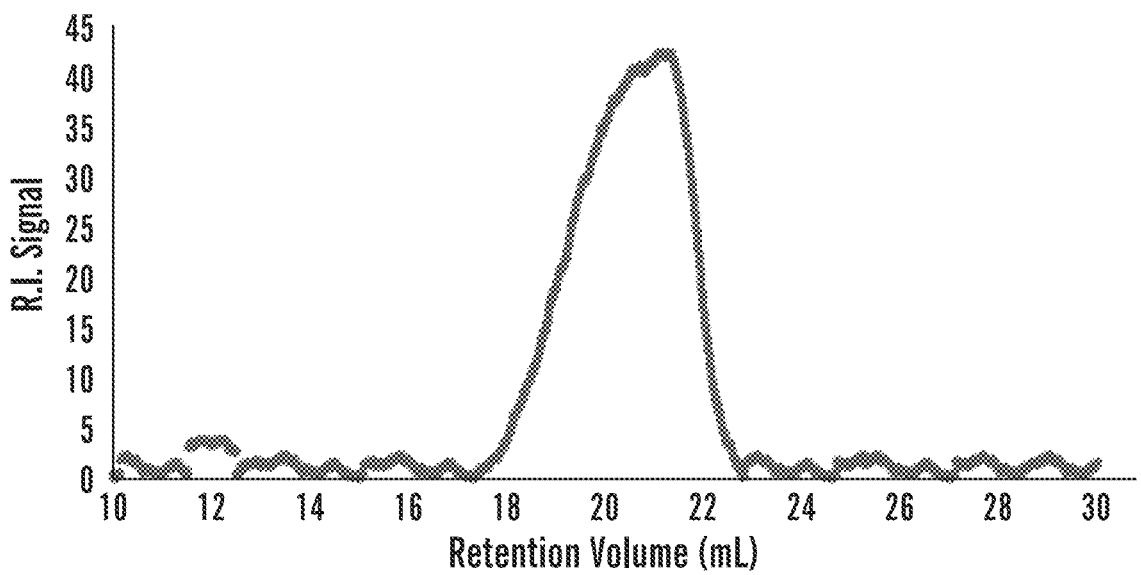
FIG. 15 is a graph showing the GPC trace of poly-methacrylate sorbitol 30 kDa PDI of 2.52

The molecular weight results of the polymerization can be seen in FIG. 15. The methacrylate sorbitol monomer, before polymerization, had an acrylate content of 1.2 functionality.

Poly-Methacrylate Isosoribide~Poly-Acrylate Epoxidized Soybean Oil

Figure 16:
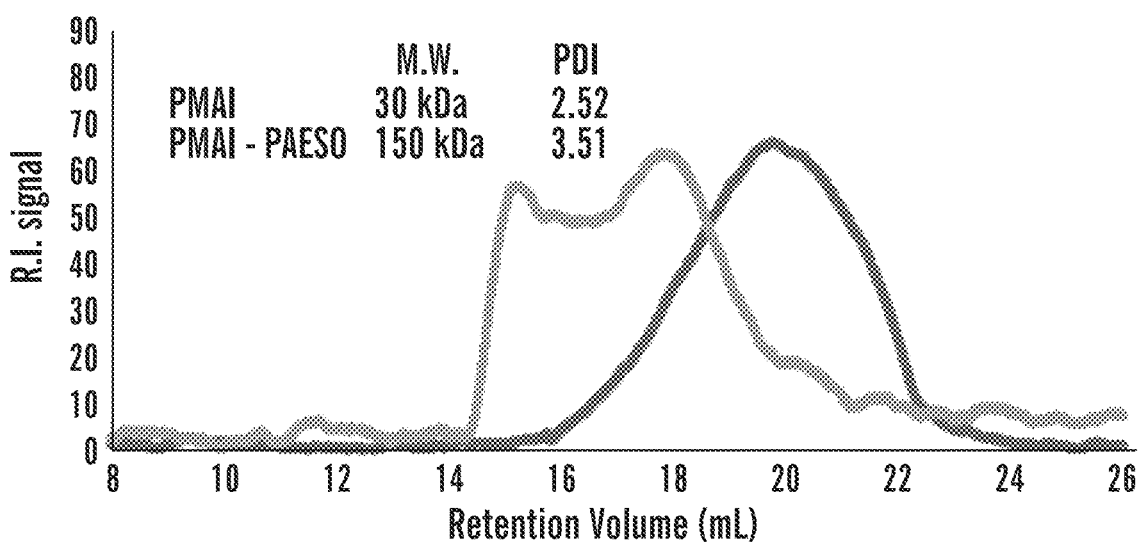
FIG. 16 is a graph showing the GPC trace over lay of base polymer use to produce Poly-Methacrylate Isosorbide~Poly-Acrylate Epoxidized Soybean Oil.

The GPC curve of butyl acrylate can be seen in FIG. 16. The target for PMAI content was 30%.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A block copolymer comprising at least one PA block and at least one PB block, wherein PA represents a polymer block comprising one or more units of monomer A and PB represents a polymer block comprising one or more units of monomer B, with monomer A being an acrylated and acylated or acetalized polyol monomeric unit, wherein the acrylated and acylated or acetalized polyol monomeric unit has an average degree of acrylation which is 1 or more, but less than the number of the hydroxyl groups of the polyol and have an average degree of acylation or acetalization which is 1 or more, but less than the number of the hydroxyl groups of the polyol, and monomer B being a radically polymerizable monomer, wherein the PA block and PB block each have a linear or branched-chain structure, wherein the block copolymer has a molecular weight ($M_n$) ranging from 5 to 10 MDa.

2. The block copolymer of claim 1, wherein the polyol of the monomer A is selected from the group consisting of ethylene glycol, propylene glycol, dipropylene glycol, 1,2,4-butanetriol, 1,7-heptanediol, glycerol, panaxatriol, panaxytriol, talose, balsaminol B, momordol, erythritol, enterodiol, xylitol, miglitol, sorbitol, isosorbide, mannitol, galactitol, isomalt, maltitol, aldohexose, aldopentose, aldotetrose, aldotriose, aldose, allose, altrose, arabinose, amylopectin, amylose, dextrose, erythrose, fructose, galactose, glucose, gulose, hexose, idose, ketohexose, ketose, lactose, lyxose, maltose, mannose, pentose, ribose, saccharose, sucrose, talose, tetrose, triose, xylose, and stereoisomers thereof.

3. The block copolymer of claim 1, wherein the monomer B is a vinyl, acrylic, diolefin, nitrile, dinitrile, acrylonitrile monomer, a monomer with reactive functionality, or a crosslinking monomer.

4. The block copolymer of claim 1, wherein the monomer B is selected from the group consisting of styrene, α-methyl styrene, t-butyl styrene, vinyl xylene, vinyl naphthalene, vinyl pyridine, divinyl benzene, methyl acrylate, methyl (meth)acrylate, ethyl (meth)acrylate, propyl (meth)acrylate, butyl (meth)acrylate, heptyl (meth)acrylate, hexyl (meth)acrylate, acrylonitrile, adiponitrile, methacrylonitrile, butadiene, isoprene, radically polymerizable plant oils, and mixtures thereof.

5. The block copolymer of claim 1, wherein the monomer B is derived from a radically polymerizable plant oil selected from the group consisting of soybean oil, linseed oil, corn oil, flax seed oil, and rapeseed oil.

6. The block copolymer of claim 5 further comprising:
at least one PC block, wherein PC represents a polymer block comprising one or more units of monomer C, with monomer C being a radically polymerizable monomer.

7. The block copolymer of claim 1, comprising at least one PA block and at least one PB block, wherein PA represents a polymer block comprising one or more units of monomer A and PB represents a polymer block comprising one or more units of monomer B, with monomer A being an acrylated and acylated polyol monomeric unit, wherein the acrylated and acylated polyol monomeric unit has an average degree of acrylation which is 1 or more, but less than the number of the hydroxyl groups of the polyol and have an average degree of acylation which is 1 or more, but less than the number of the hydroxyl groups of the polyol, and monomer B being a radically polymerizable monomer.

8. The block copolymer of claim 1, comprising at least one PA block and at least one PB block, wherein PA represents a polymer block comprising one or more units of monomer A and PB represents a polymer block comprising one or more units of monomer B, with monomer A being an acrylated and acetalized polyol monomeric unit, wherein the acrylated and acetalized polyol monomeric unit has an average degree of acrylation which is 1 or more, but less than the number of the hydroxyl groups of the polyol and have an average degree of acetalization which is 1 or more, but less than the number of the hydroxyl groups of the polyol, and monomer B being a radically polymerizable monomer.

9. A statistical copolymer having a general formula of:

[Ai-Bj-Ck]q, wherein:

A represents monomer A, which is an acrylated and acylated or acetalized polyol monomeric unit, wherein the acrylated and acylated or acetalized polyol monomeric unit has an average degree of acrylation which is 1 or more, but less than the number of the hydroxyl groups of the polyol and have an average degree of acylation or acetalization which is 1 or more, but less than the number of the hydroxyl groups of the polyol;

B represents monomer B, which is a radically polymerizable monomer; and

C represents monomer C, which is a radically polymerizable monomer, provided that the monomer B is different than the monomer A, and the monomer C is different than the monomer A or monomer B;

i, j, and k are average number of repeating units of monomer A, monomer B, and monomer C, respectively, such that i and j are each greater than 0 and less than 1, k is 0 to less than 1, provided that i+j+k=1; and q represents the number average degree of polymerization and ranges from 10 to 100,000, wherein the acrylated and acylated or acetalized polyol monomeric unit contains one or more conjugated sites.

10. The statistical copolymer of claim 9, wherein the polyol of the monomer A is selected from the group consisting of ethylene glycol, propylene glycol, dipropylene glycol, 1,2,4-butanetriol, 1,7-heptanediol, glycerol, panaxatriol, panaxytriol, talose, balsaminol B, momordol, erythritol, enterodiol, xylitol, miglitol, sorbitol, isosorbide, mannitol, galactitol, isomalt, maltitol, aldohexose, aldopentose, aldotetrose, aldotriose, aldose, allose, altrose, arabinose, amylopectin, amylose, dextrose, erythrose, fructose, galactose, glucose, gulose, hexose, idose, ketohexose, ketose, lactose, lyxose, maltose, mannose, pentose, ribose, saccharose, sucrose, talose, tetrose, triose, xylose, and stereoisomers thereof.

11. The statistical copolymer of claim 9, wherein the monomer B and the monomer C, if present, are each independently vinyl, acrylic, diolefin, nitrile, dinitrile, acrylonitrile monomers, a monomer with reactive functionality, or a crosslinking monomer.

12. The statistical copolymer of claim 9, wherein the monomer B and the monomer C, if present, are each independently styrene, α-methyl styrene, t-butyl styrene, vinyl xylene, vinyl naphthalene, vinyl pyridine, divinyl benzene, methyl acrylate, methyl (meth)acrylate, ethyl (meth)acrylate, propyl (meth)acrylate, butyl (meth)acrylate, heptyl (meth)acrylate, hexyl (meth)acrylate, acrylonitrile, adiponitrile, methacrylonitrile, butadiene, isoprene, radically polymerizable plant oils, or mixtures thereof.

13. The statistical copolymer of claim 12, wherein the radically polymerizable plant oil is selected from the group consisting of soybean oil, linseed oil, corn oil, flax seed oil, and rapeseed oil.

14. The statistical copolymer of claim 9, wherein the statistical copolymer has a general formula of:

$[A_i\text{-}B_j\text{-}C_k]_q$, wherein:

A represents monomer A, which is an acrylated and acylated polyol monomeric unit, wherein the acrylated and acylated polyol monomeric unit has an average degree of acrylation which is 1 or more, but less than the number of the hydroxyl groups of the polyol and have an average degree of acylation which is 1 or more, but less than the number of the hydroxyl groups of the polyol;

B represents monomer B, which is a radically polymerizable monomer; and

C represents monomer C, which is a radically polymerizable monomer, provided that the monomer B is different than the monomer A, and the monomer C is different than the monomer A or monomer B;

i, j, and k are average number of repeating units of monomer A, monomer B, and monomer C, respectively, such that i and j are each greater than 0 and less than 1, k is 0 to less than 1, provided that i+j+k=1; and q represents the number average degree of polymerization and ranges from 10 to 100,000.

15. The statistical copolymer of claim 9, wherein the statistical copolymer has a general formula of:

$[A_i\text{-}B_j\text{-}C_k]_q$, wherein:

A represents monomer A, which is an acrylated and acetalized polyol monomeric unit, wherein the acrylated and acetalized polyol monomeric unit has an average degree of acrylation which is 1 or more, but less than the number of the hydroxyl groups of the polyol and have an average degree of acetalization which is 1 or more, but less than the number of the hydroxyl groups of the polyol;

B represents monomer B, which is a radically polymerizable monomer; and

C represents monomer C, which is a radically polymerizable monomer, provided that the monomer B is different than the monomer A, and the monomer C is different than the monomer A or monomer B;

i, j, and k are average number of repeating units of monomer A, monomer B, and monomer C, respectively, such that i and j are each greater than 0 and less than 1, k is 0 to less than 1, provided that i+j+k=1; and q represents the number average degree of polymerization and ranges from 10 to 100,000.

* * * * *